US012126981B1

(12) United States Patent
Mettler et al.

(10) Patent No.: US 12,126,981 B1
(45) Date of Patent: Oct. 22, 2024

(54) FORCE BALANCED ACOUSTIC TRANSDUCER

(71) Applicant: Tectonic Audio Labs, Inc., Woodinville, WA (US)

(72) Inventors: Ryan C. Mettler, Kirkland, WA (US); Timothy C. Whitwell, Kirkland, WA (US); Philip C. Bunch, Lake Stevens, WA (US)

(73) Assignee: Tectonic Audio Labs, Inc., Woodinville, WA (US)

( * ) Notice: Subject to any disclaimer, the term of this patent is extended or adjusted under 35 U.S.C. 154(b) by 0 days.

(21) Appl. No.: 18/234,872

(22) Filed: Aug. 16, 2023

(51) Int. Cl.

| | |
|---|---|
| ***H04R 9/06*** | (2006.01) |
| ***H04R 1/40*** | (2006.01) |
| ***H04R 7/16*** | (2006.01) |
| ***H04R 9/02*** | (2006.01) |
| ***H04R 9/04*** | (2006.01) |

(52) U.S. Cl.
CPC ............. *H04R 9/063* (2013.01); *H04R 1/403* (2013.01); *H04R 7/16* (2013.01); *H04R 9/025* (2013.01); *H04R 9/046* (2013.01); *H04R 9/06* (2013.01); *H04R 2209/026* (2013.01); *H04R 2400/11* (2013.01); *H04R 2499/11* (2013.01)

(58) Field of Classification Search
CPC . H04R 1/24; H04R 1/403; H04R 7/16; H04R 7/18; H04R 9/025; H04R 9/046; H04R 9/06; H04R 9/063; H04R 2209/026; H04R 2209/027; H04R 2499/11
See application file for complete search history.

(56) References Cited

U.S. PATENT DOCUMENTS

| | | | | |
|---|---|---|---|---|
| 4,783,820 A * | 11/1988 | Lyngdorf | ............... | H04R 1/227 381/89 |
| 10,250,994 B2 | 4/2019 | Griffiths | | |
| 10,631,096 B1 | 4/2020 | Garcia Selva et al. | | |
| 11,700,490 B2 | 7/2023 | Zhou et al. | | |
| 2004/0071303 A1 * | 4/2004 | Furuya | .................. | H04M 1/035 379/433.02 |
| 2007/0098209 A1 * | 5/2007 | Setiabudi | ............... | H04R 9/063 381/420 |

(Continued)

FOREIGN PATENT DOCUMENTS

| | | |
|---|---|---|
| WO | 2015049218 | 4/2015 |
| WO | 2022206045 | 10/2022 |

*Primary Examiner* — Huyen D Le
(74) *Attorney, Agent, or Firm* — Toussaint L. Myricks

(57) ABSTRACT

An acoustic transducer comprising a plurality of acoustic diaphragms configured to vibrate in opposing directions in response to a received electrical signal, a frame assembly coupled to a first diaphragm and a second diaphragm of the plurality of acoustic diaphragms, a plurality of suspension elements coupled to the plurality of acoustic diaphragms, the plurality of suspension elements comprising at least two primary-suspension-elements and at least two secondary-suspension-elements, and a magnet assembly fixedly positioned within the frame assembly including a housing, at least two magnets, a first pole piece mounted on a first of the at least two magnets and a second pole piece mounted on a second of the at least two magnets, the housing having at least a first region for placement of a first magnet and a first vertical portion having a vertical height greater than a vertical height of the first magnet or a second magnet.

25 Claims, 17 Drawing Sheets

(56) References Cited

U.S. PATENT DOCUMENTS

| | | | | |
|---|---|---|---|---|
| 2012/0237077 | A1 * | 9/2012 | Nedelcu ................ | H04R 9/022<br>381/397 |
| 2023/0199398 | A1 | 6/2023 | Shao et al. | |

* cited by examiner

FORCE BALANCED ACOUSTIC TRANSDUCER

FIELD

The present disclosure relates generally to the field of audio systems and, in particular but not exclusively, relates to a thin profile, force cancelling audio transducer and a method of making the same for the generation and transmission of acoustic frequency signals.

BACKGROUND

A wide variety of acoustic transducers have been developed and have useful roles in both consumer and industrial applications. In the current era, there is a growing need for audio transducers that can provide quality acoustic output with smaller form factors and placed in more compact locations, such as in small, compartmentalized locations in automobiles, aircraft and in other forms of commercial and consumer transportation. In addition, industrial design practices have led to the production of audio products with performance requirements that are difficult to achieve in locations with substantially more limited space. Increasingly, there is a need for high quality audio performance from audio devices with very thin vertical profiles. For example, under current design practices thin or compact audio systems, such as those found in televisions and soundbars, are likely to have limited bass performance.

In addition to growing requirements for thinner audio transducers for the growing array of consumer and industrial needs, there is also a need to design audio systems that can provide quality audio output without the often substantial transmission of mechanical vibrations that accompany audio performance in the bass frequency ranges. With the growing use in consumer devices of lightweight plastic materials, often including built-in microphones for added functionality, the bass performance from audio transducers embedded in such devices is often compromised by a loss of energy to due mechanical vibrations into the surrounding materials. Correspondingly, these high vibration amplitudes can degrade the audio performance of audio systems, including the audio performance of microphones within audio systems, can introduce visual artifacts on embedded display screens, and produce audible distortions in acoustic output that can be perceived by users and measured by audio test equipment. In addition, any efforts to reduce the height of such commonly used consumer audio devices can further compound and greatly impair the output performance of these devices.

Hence, there are growing challenges associated with achieving optimal audio performance, especially in the bass frequency performance range, in increasingly smaller devices while mitigating the effects of mechanical vibrations on these devices when operating in this range. Therefore, there is a significant and growing need for audio transducers that can deliver high quality audio performance, particularly in bass frequencies, in thinner and more compact industrial designs that also substantially reduce or eliminate the mechanical vibrations that consumer and industrial devices with embedded audio transducers experience during their operation.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

In the description to follow, various aspects of embodiments of force balanced audio transducers will be described, and specific configurations will be set forth. Numerous and specific details are given to provide an understanding of these embodiments. The aspects disclosed herein can be practiced without one or more of the specific details, or with other methods, components, systems, services, etc. In other instances, structures or operations are not shown or described in detail to avoid obscuring relevant inventive aspects.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification do not necessarily all refer to the same embodiment. Furthermore, particular features, structures, or characteristics may be combined in any suitable manner in one or more embodiments.

Terminology used for the purpose of describing particular aspects only is not intended to be limiting of the subject matter disclosed herein. Spatially relative terms, such as "beneath", "below", "lower", "above", "upper", and the like may be used herein for ease of description of relationships between elements or features, as illustrated in the accompanying figures. It is to be understood that spatially relative terms are intended to encompass different orientations of the apparatus in use or operation in addition to the orientation depicted in the figures. For example, if the apparatus in the figures is turned over, elements described as "below" or "beneath" other elements or features would then be oriented "above the other elements or features. Thus, the exemplary term "below" can encompass both an orientation of above and below. The apparatus may be otherwise oriented (e.g., rotated 90 degrees or at other orientations) and the spatially relative descriptors used here in interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements and/or components, but do not preclude the presence or addition of one or more other features, steps, operations, elements, components, and/or groups thereof.

The terms "or" and "and/or" as used herein are to be interpreted as inclusive or meaning any one or more combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
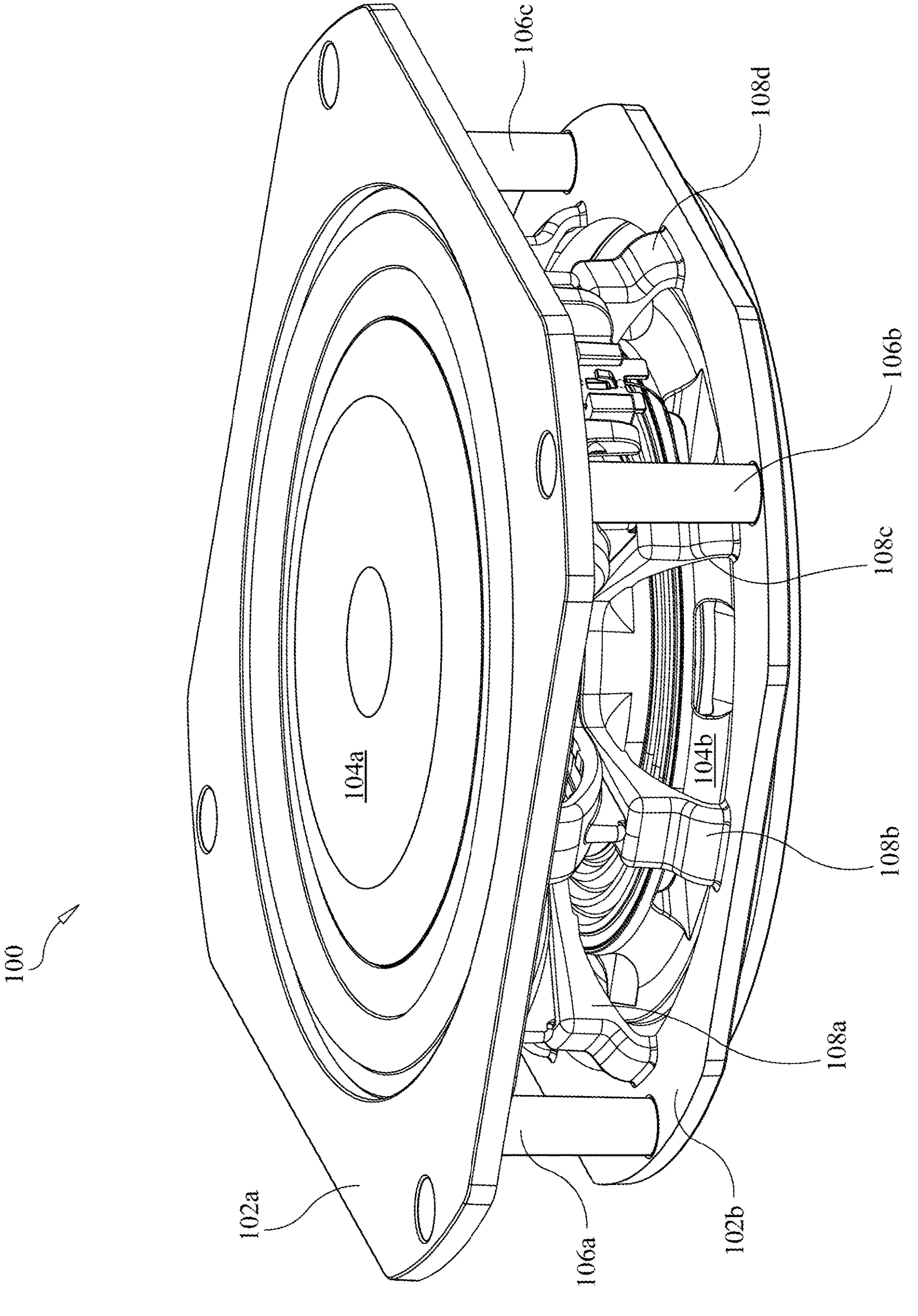
FIG. 1 is an illustration of a force balanced acoustic transducer in an embodiment.

FIG. 1 is an illustration of an embodiment of a force balanced audio transducer 100. In the illustrated embodiment, the audio transducer 100 is comprised of a first diaphragm 104*a*, a second diaphragm 104*b*, a first frame component 102*a*, a second frame component 102*b*. The frame components 102*a*, 102*b* consist of a plurality of mounting posts 106*a*, 106*b*, 106*c* disposed around the audio transducer 100. The support posts 106*a*, 106*b*, 106*c* in one embodiment are used to facilitate assembly and mounting of the audio transducer 100 to an enclosure and to provide structural rigidity for the audio transducer 100. Although only three support posts are shown in this illustration, it is to be understood by those skilled in the art that additional support posts (not shown) can be included in a force balanced audio transducer without departing from the scope of the subject matter disclosed herein. The frame components 102*a*, 102*b* are structurally supported by a plurality of integral support members 108*a*, 108*b*, 108*c*, 108*d*. The support members 108*a*, 108*b*, 108*c*, 108*d* additionally provide support for internal components, not shown here, that are disposed around the interior of the acoustic transducer 100. Such a structure maximizes radiating area within the component's footprint within a product, such as sound bars, smart speakers, televisions, embedded compact audio systems, etc. Maximizing radiating area decreases the requirement for large diaphragm displacements. This in turn allows for a thin product profile while maintaining quality audio output over the bass frequency range. In operation, the force balanced audio transducer 100 radiates audio signals in the bass and midrange frequencies from vibration of the first diaphragm 104*a* and vibration of the second diaphragm 104*b* in equal and opposite directions such that the reaction forces produced by vibration of the diaphragms structurally cancel within the body of the acoustic transducer 100. In a first embodiment, the first diaphragm 104*a* and the second diaphragm 104*b* are comprised of a rigid plastic, nonferrous metal, paper, graphene-based material, composite materials, or other audio transducer diaphragm materials as is known by those skilled in the art. The cancellation of reaction forces due to the movement of the diaphragms 104*a*, 104*b* confers substantial benefits including greatly improved audio output quality through reduction in losses and audible distortion, enhanced product stability during operation, and improvements to auxiliary functions within various products, such as improved microphone performance and substantially reduced vibration induced display screen artifacts.

Figure 2:
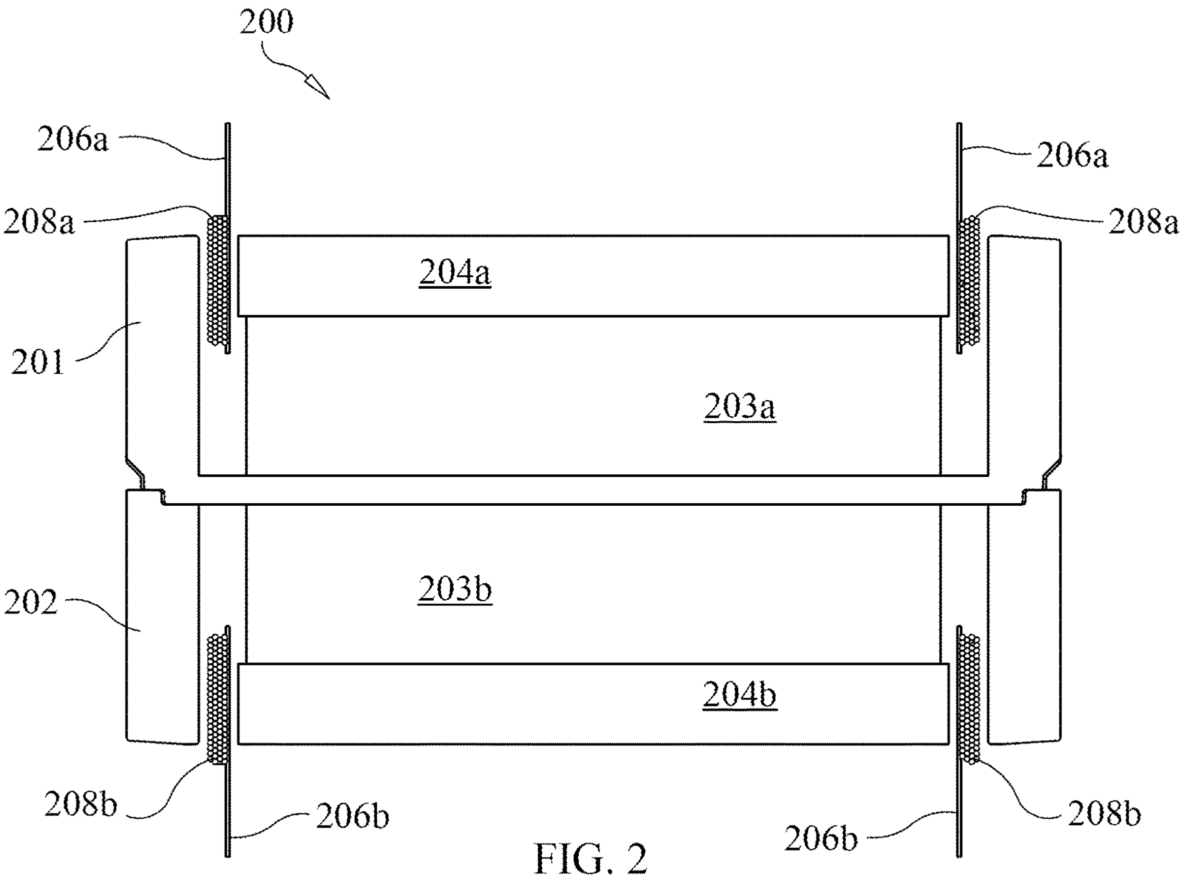
FIG. 2 is a cross-sectional view of electromechanical transducer components of a force balanced acoustic transducer in an embodiment.

FIG. 2 is an illustration of a cross section 200 of the electromechanical transducer components in part of the audio transducer 100 in an embodiment. This combination of components converts electrical signal current into two mechanical forces which in turn act upon two diaphragms (not shown) to create acoustic radiation. In this illustrated embodiment, the electromechanical transducer 200 is comprised of two structural components, a cup structure 201 and a sleeve structure 202. In a first design embodiment, the cup structure 201 is designed to include an indented region for receiving and coupling to the sleeve structure 202. In an embodiment, the cup structure 201 is comprised of a ferrous material (also referred to as a ferrous cup) and the sleeve structure 202 is comprised of the same ferrous material. In principle, the electromechanical transducer includes structures that are similar in function but at least one varied height cup must provide a base that is able to provide structural support for additional components within the cup structure 201. As illustrated, a first structure placed within the cup structure 201 is comprised of a pole piece 204*a* and a magnet 203*a*. In the illustrations of the various embodiments described herein, the pole pieces 204*a*, 204*b* can be comprised of magnetically permeable materials such as ferrous steel (typically low carbon steel grades), alloys comprised of iron, nickel, and cobalt such as permalloy, Permendur®, or mu-metal. A continuous first air gap exists circumferentially around the pole piece 204*a*—and magnet structure 203*a* into which a coil former 206*a* is placed and upon the coil former an electrical coil 208*a* is wound for the purposes of conducting current. The air gap provides clearance for the vibrational motion in the vertical direction of the coil former 206*a* and electrical coil 208*a*. Correspondingly, a pole piece 204*b* and a magnet 203*b* are placed within the sleeve structure 202 and a coil former 206*b* is disposed within the air gap defined between the sleeve structure 202 and, collectively, the pole piece 204*b* and the magnet 203*b*. An electrical coil 208*b* is wound around the coil former 206*b* for the conduction of an electrical current.

Continuing in FIG. 2, an embodiment of a magnet assembly is illustrated that is comprised of magnets arranged within a ferrous structure and that collectively form a magnetic circuit in which a static magnetic field is established. Although this combination of components is referred to generally as a magnet assembly, within the disclosed structure defining a force-balanced acoustic transducer, this magnet assembly forms a motor subassembly since it is the electro-magneto-mechanical motor that initiates and drives the vibrational action of the diaphragms that are coupled to the transducer. In the illustrated embodiment, the pathway of the static magnetic field through this magnetic circuit flows from a north pole of a first magnet 203*a*, through a first pole piece 204*a*, across a first air gap containing the first coil former 206*a* and electrical coil 208*a* combination, down the wall of a ferrous cup structure 201, down a sleeve structure 202, across a second air gap containing a second coil former 206*b* and electrical coil 208*b* combination, through a second pole piece 204*b*, a south pole of a second magnet 203*b*, through the base of the ferrous cup structure 201, and into a south pole of the first magnet 203*a* to complete the magnetic circuit. The polarity of both magnets 203*a*, 203*b* can be switched without affecting the functionality of the audio transducer 100 but both magnets 203*a*, 203*b* must have their polarities aligned with each other in the vertical direction. The shape and size of each air gap is formed by the symmetrically positioned components positioned in an upper region and a lower region of the motor subassembly. A plane of symmetry is defined in a direction normal to the direction of vibration of each diaphragm and is positioned horizontally midway between the position of the first pole piece 204*a* and the position of the second pole piece 204*b*. This position of the plane of symmetry ensures that the location of each electrical coil 208*a*, 208*b* in each air gap will contain the same magnitude of magnetic flux even though the magnetic field flowing through the first air gap will be oriented in an opposite radial direction from the magnetic field flowing through the second air gap. The two functionally identical electrical coils 208*a* and 208*b* may either be wired in parallel, in series, or driven with individual matched gain amplifiers. In either case, the flow of current within each coil 208*a*, 208*b* must be in the same direction so that, in combination with the magnetic fields, electromotive forces are generated on each coil that act in equal and opposite directions. The electromotive forces act on both the electrical coils 208*a* and 208*b*, but reaction forces are also applied back on the motor subassembly. Since the coils 208*a*, 208*b* are moving in opposite directions, the reaction forces applied to the motor subassembly by the interaction between each of the coils and the static magnetic field, are also acting in opposite directions. These reaction forces thus are cancelled locally within the motor subassembly.

Figure 3A:
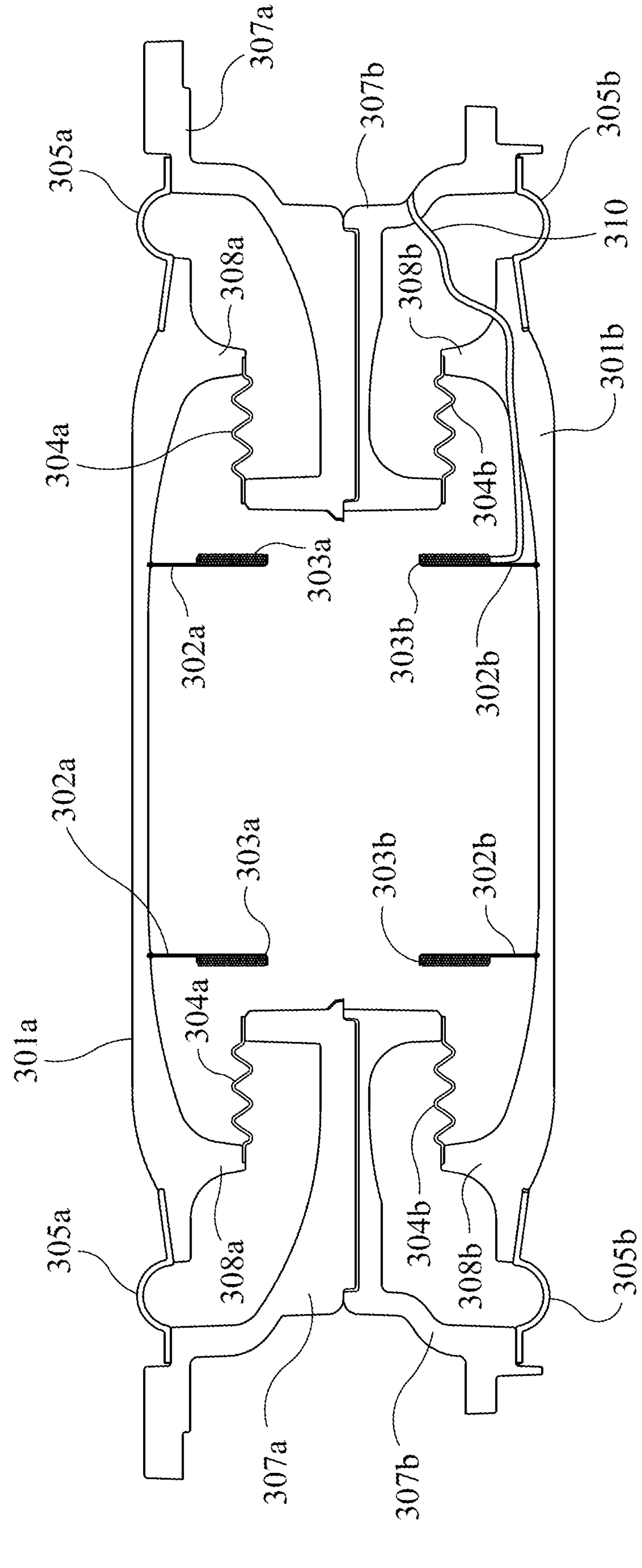
FIG. 3A is a cross-sectional view of structural components of a force balanced acoustic transducer in an embodiment.

FIG. 3A is a cross section of the structural and moving components of an audio transducer 100 in an embodiment. A first diaphragm 301*a* is coupled to the first end of an upper primary suspension element 305*a*, commonly referred to as a roll surround, that extends along the perimeter of a first diaphragm 301*a*. The upper primary suspension element, 305*a* is provided as a means for applying a positional restoring force to the first diaphragm 301*a*, damping the vibrational motion of the first diaphragm 301*a*, and sealing the outer edge of the first diaphragm 301*a*. The second end of the upper primary suspension element 305*a* is connected to a first frame component 307*a* which provides structural support for elements which are coupled to the first diaphragm 301*a* and other components internal to the audio transducer 100. A structural extension 308*a* of the first diaphragm 301*a* provides a connecting point for an upper secondary suspension element 304*a*. The secondary suspension element 304*a*, is comprised of a compliant material or structure and provides a restoration force against the displacement of the first diaphragm 301*a*. In addition to being connected to the structural extension 308*a*, the upper secondary suspension element 304*a* is connected to an extended portion of the first frame component 307*a*. A coil former 302*a* is coupled to the inner surface of the first diaphragm 301*a* and an electrical coil 303*a* is wound upon the coil former 302*a*. A dual acoustic structure is formed from the addition of an equivalent structure on the opposite side of the transducer 100 which is comprised of a second diaphragm 301*b*, a second structural extension 308*b*, a lower primary suspension element 305*b* which is coupled to a second frame component 307*b*. The second diaphragm 301*b* has a second coil former 302*b* connected to its inner surface upon which a second electrical coil 303*b* is wound. In addition, a lower secondary suspension element 304*b* is coupled on a first end to the structural extension 308*b* of the second diaphragm 301*b* and on a second end to the second frame component 307*b*. Secondary suspension elements 304*a*, 304*b* are shown as radially corrugated fabric elements often referred to as "spiders." In an alternate embodiment, the secondary suspension elements may be comprised of multiple flexible armatures (not illustrated) which respectively couple on a first end to each structural extension 308*a* and 308*b* and on a second end the flexible armatures can be coupled to either of the frame components 307*a*, 307*b*. A plane of symmetry for the suspension elements is defined as normal to the direction of vibration of each diaphragm and is positioned midway between the electrical coils 303*a*, 303*b*. The upper primary suspension element 305*a* is symmetric in structure and equivalent in material with the lower primary suspension element 305*b*. Likewise, the upper secondary suspension element 304*a* is symmetric in structure and equivalent in material with the lower secondary suspension element 304*b*. In alternative embodiments including armatures as secondary suspension elements, interleaving or other accommodating geometries can be used to prevent collisions between upper and lower configurations of armatures during operation of the acoustic transducer. Although such upper and lower configurations of armatures may not be geometrically symmetric about a plane of symmetry, these configurations of armatures are functionally symmetric in operation and geometrically similar in form. An electrical signal wire 310 is extended within the support member 307*b* in the illustrated embodiment, is coupled to the coil former 302*b*, and provides an electrical signal current to the electrical coil 303*b*. Although illustrated as coupled only to the coil former 302*b* which is connected to the inner surface of the second diaphragm 301*b*, additional wires must be added in a similar manner such that each of the two coils 303*a*, 303*b* has two wires leading out of the acoustic transducer 100. An electrical current provided to both electrical coils 303*a*, 303*b*, in conjunction with the orientation of the magnetic fields, serves as the generative source of two opposing electromagnetic forces. Equal and opposite forces generated at the electrical coils 303*a* and 303*b* are transferred to the diaphragms 301*a*, 301*b* through the coil formers 302*a* and 302*b*. The diaphragms are thus accelerated in a vibrational motion by the transferred forces and radiate sound as a result. The upper and lower suspension elements 304*a*, 304*b*, 305*a*, 305*b* provide restoration forces resisting the displacement, and damping forces resisting the velocity of the diaphragms 301*a*, 301*b* while in operation. The restorative and damping forces applied by the upper suspension elements 304*a* and 305*a* on the first diaphragm create an equal and opposite reaction on the first frame component 307*a*. Likewise, the restorative and damping forces applied by the lower pair of the suspension elements 304*b* and 305*b* on the second diaphragm create an equal and opposite reaction on the second frame component 307*b*. Since the motion of the two diaphragms 301*a*, 301*b* are equal and opposite, the restoration and damping forces generated from the suspension elements 304*a*, 305*a*, 304*b*, 305*b* acting on the frames are also equal and opposite. Since the two frame components 307*a*, 307*b* are rigidly coupled together, the reaction forces imposed by the suspension elements 304*a*, 305*a*, 304*b*, 305*b* are cancelled within the frame components 307*a*, 307*b* and thus within the audio transducer 100.

Figure 3B:
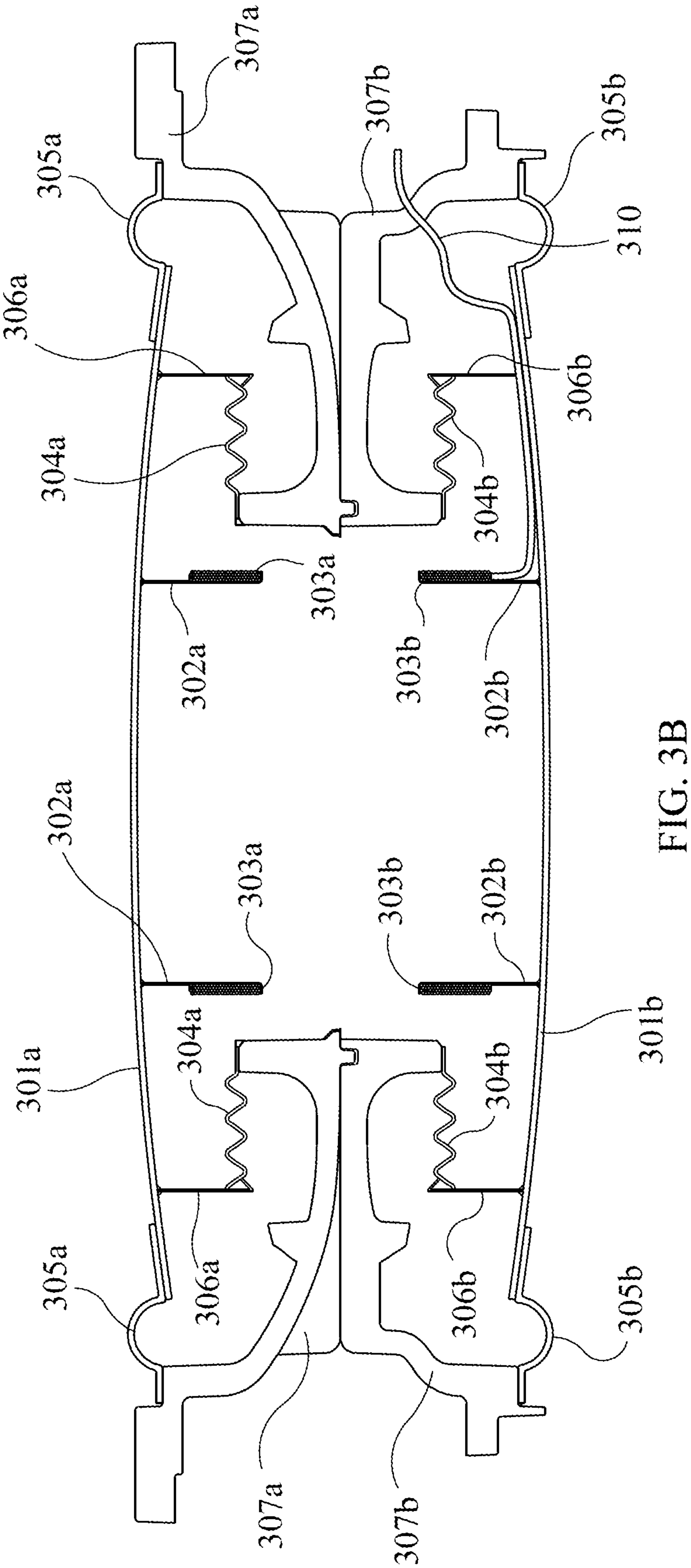
FIG. 3B is a cross-sectional view of structural components of a force balanced acoustic transducer in an embodiment.

FIG. 3B is a cross section of an alternative embodiment of the audio transducer 100. In this alternative embodiment, a first diaphragm 301*a* and a second diaphragm 301*b* are provided, each of which are coupled to a frame component 307*a*, 307*b* using a respective primary suspension element 305*a*, 305*b*. In addition, each diaphragm 301*a*, 301*b* includes a secondary suspension support component 306*a*, 306*b* coupled to and extending from the inner surface of each diaphragm 301*a*, 301*b* to a secondary suspension element 304*a*, 304*b*. The upper secondary suspension support component 306*a* extending from the inner surface of the first diaphragm 301*a* is coupled to an upper secondary suspension element 304*a* on a first end. On a second end, the upper secondary suspension element 304*a* is coupled to an extension of a first frame component 307*a*. A lower secondary suspension support component 306*b* is coupled to a first end of a lower secondary suspension element 304*b*. The second end of the lower secondary suspension element 304*b* is coupled to a structural extension from a second frame component 307*b*. In the illustrated embodiment, and for clarification, each primary suspension element 305*a*, 305*b* is a roll surround with one placed around the perimeter of each diaphragm 301*a*, 301*b* in an embodiment. Each of the secondary suspension elements 304*a*, 304*b* provides a spring-like restoring force that acts upon each diaphragm 301*a*, 301*b* such that the mechanical forces acting upon each diaphragm 301*a*, 301*b* result in equal and opposite motion of the two diaphragms 301*a*, 301*b* and the local cancellation of forces substantially eliminates the mechanical vibrations in the frame components 307*a*, 307*b* of the acoustic transducer 100.

Figure 4:
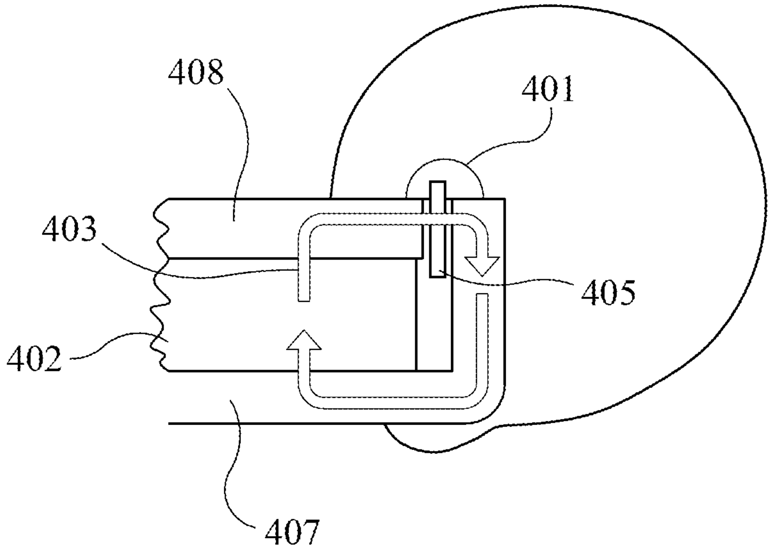
FIG. 4 is an axisymmetric illustration of a magnetic circuit for a conventional acoustic transducer in an embodiment.

FIG. 4 is an illustration of the magnetic circuit formed by a conventional audio transducer in an embodiment. In this embodiment, a pole piece 408, a magnet 402, and electrical coil 405 are shown in an arrangement depicting a magnetic structure within a ferrous cup 407. From an electromagnetic perspective, this figure illustrates the flow of a magnetic field 403 induced by the magnet 402 and flowing through the pole piece 408, the electrical coil 405 positioned within an air gap, a ferrous cup 407, and returning to the magnet 402 completing the magnetic circuit. The magnetic circuit is designed to focus the magnetic field to produce a high flux density region within the air gap, generally where the electrical coil 405 is positioned. Expanding magnetic field contour line 401 is shown to illustrate the spread of the fringing magnetic field in air surrounding the air gap. The structure displayed in this illustration represents the foundation of conventional cup motor design.

Figure 5:
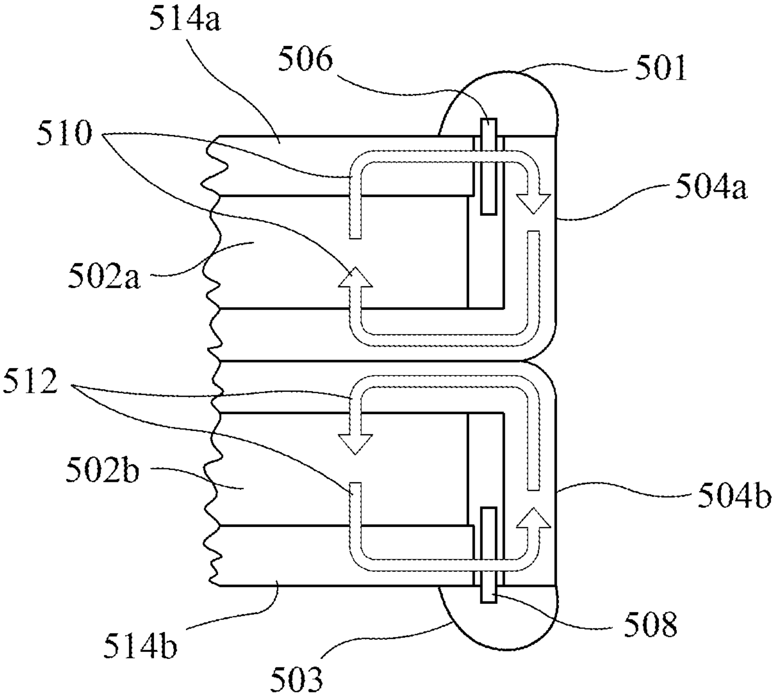
FIG. 5 is an axisymmetric illustration of a dual magnetic circuit for a conventional acoustic transducer in an embodiment.

FIG. 5 illustrates an embodiment of a conventional acoustic transducer including a dual magnetic structure. In this illustrated embodiment, the first magnetic circuit is formed from a ferrous cup 504A, an electrical coil 506, a pole piece 514*a*, and a magnet 502*a*. In this circuit, a static magnetic field 510 flows through these components and gives rise to an expanding magnetic field contour line 501. This first structural combination is repeated in a second structural combination placed on the outer surface of the base of the ferrous cup 504*a*. The second structural combination is comprised of a second ferrous cup 504*b*, a second magnet 502*b*, a second pole piece 514*b*, and a second electrical coil 508. The magnetic field 512 flows through each of the enumerated structural components including the pole piece 514*b*, electrical coil 508, and through the ferrous cup 504*b*. However, in this embodiment, the magnetic poles of each magnet have been placed in magnetically opposite directions such that the north poles of each magnet are on opposite ends of the composite structure. In many cases, ferrous components are near or below the point of magnetic saturation to prevent the much smaller magnetic field generated from current flowing within the electrical coil from modulating the static magnetic field generated by the magnetic circuit. A modulated static magnetic field causes undesirable distortion in the transmitted force from the electrical coil. The localized region of high saturation in the base of the ferrous cups restricts the magnetic field that can flow through the rest of the magnetic circuits and the air gap on either side represented in this figure by the reduced size of the expanding magnetic field contour lines 501, 503. This figure graphically illustrates the effect on a magnetic circuit if the outer surface on the base of each ferrous cup of two conventional acoustic transducers are fixed back-to-back in a commonly used force cancelling configuration. If the base of each cup 504*a*, 504*b* is in a high saturation condition, the efficiency of both conventional acoustic transducers will be reduced relative to their respective unfixed efficiencies.

Figure 6:
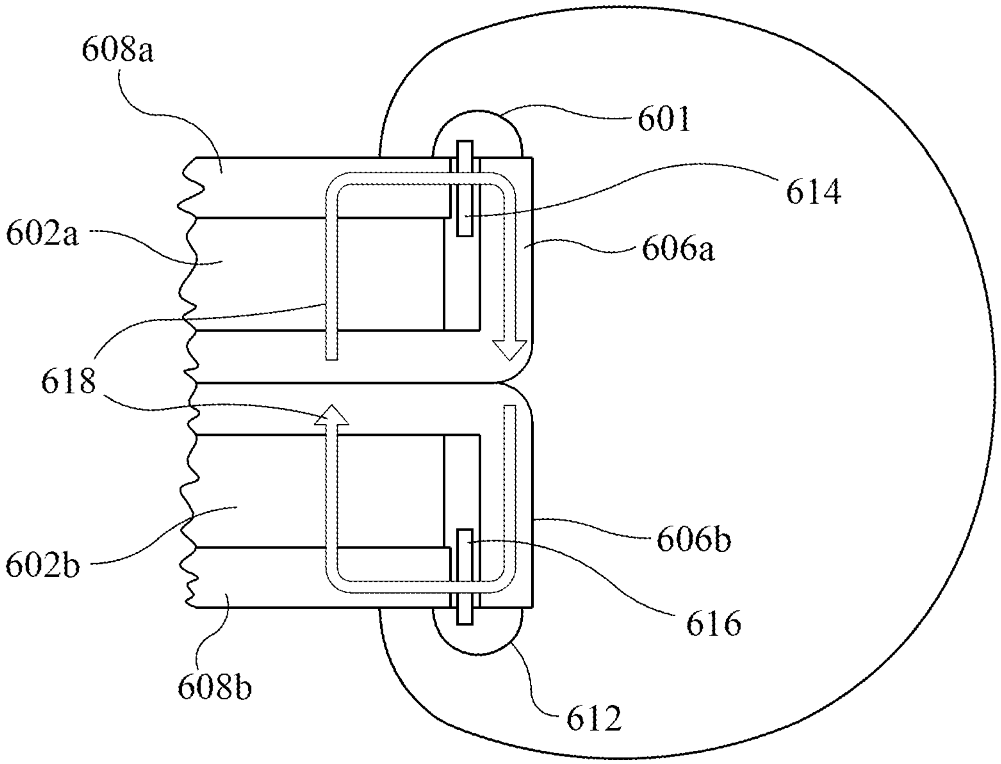
FIG. 6 is an axisymmetric illustration of a magnetic circuit for a force balanced acoustic transducer in an embodiment.

FIG. 6 is an illustration of an alternative embodiment of the dual magnetic circuit structure. In this embodiment, the magnetic orientation of each magnet 602*a*, 602*b* has been changed such that the magnetic field in each structure flows in the same direction resulting in the inducing of a larger continuous magnetic circuit. The illustrated embodiment is comprised of a first magnet 602*a*, a first ferrous cup 606*a*, a pole piece 608*a*, and an air gap in which an electrical coil has been placed. A similar magnetic structure has been coupled to the outer surface of the base of the ferrous cup 606*a* with similar structural components including a ferrous cup 606*b*, an electrical coil 616, a magnet 602*b* and a pole piece 608*b*. This composite structure is oriented in a diametrically opposite direction and mounted to the first composite structure such that the magnetic poles are aligned in the same direction. The first ferrous cup 606*a* and the second ferrous cup 606*b* in this embodiment enable the penetration of the magnetic field 618 to extend between the composite structures in the same magnetically aligned direction, providing a singular magnetic circuit flowing through the two composite structures. In this configuration the base of the magnetic cup has low saturation because the magnetic field flows from one magnet to the other through the base without substantial change of direction. This leads to higher magnetic circuit efficiency as the field is not restricted by a highly saturated region, like the embodiment shown in FIG. 5. If there is continuous ferrous material between the magnets, the thickness of the material will not cause a high saturation condition and restrict the magnetic circuit. Aligning the poles of the magnets results in higher magnetic efficiency and eliminates the need for base thickness for each ferrous cup 606*a*, 606*b*. The thickness of the base of the ferrous cups thus is only necessary for structurally supporting the magnets and pole pieces or to help facilitate heat transfer from the magnets and pole pieces.

Figure 7:
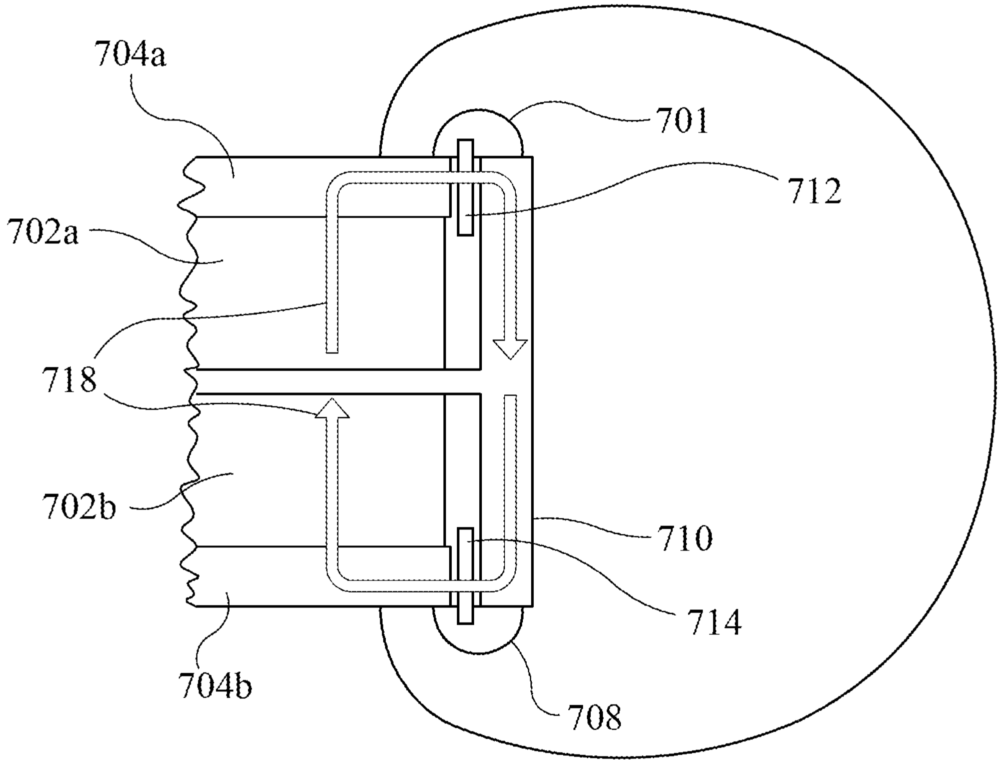
FIG. 7 is an axisymmetric illustration of a magnetic circuit for a force balanced acoustic transducer in an embodiment.

FIG. 7 is an alternative embodiment of a composite magnetic structure. In this embodiment, a single integrated ferrous structure 710 is used to form the two distinct cup regions in which the magnetic circuit components are placed. In this structure, a continuous magnetic field 718 flows through both the upper and lower regions of this composite structure. A first magnetic circuit is defined by a first magnet 702*a*, a pole piece 704*a*, an electrical coil 712, the integrated ferrous structure 710, the second coil 714, the second pole piece 704*b*, the second magnet 702*b*, and the base of the single integrated ferrous structure 710. Although depicted as an example in the dual cup embodiment, the illustrated structure is intended to depict the flow of the magnetic field 718 through one of three alternative structural embodiments for a force balanced acoustic transducer 100. Alternative embodiments of the structure are a two ferrous cup embodiment and a single ferrous cup and sleeve embodiment. In the two ferrous cup embodiment, the outer surfaces of two different but compositionally similar cup structures are bonded together using a conventional adhesive. In the single cup/sleeve embodiment, the sleeve is coupled to a single cup using an indented region along the lower base of the cup into which the upper portion of the sleeve is inserted and bonded. In all embodiments the thickness of the base of each cup can be substantially thinner than the outer walls. The magnetic flux does not need to flow radially outward through the thin section of the base, instead it flows directly from one magnet into the other. This reduces the magnetic saturation of the base, and the saturation is no longer dependent on the thickness of the base. Since the thickness of the base is no longer relevant to the efficiency of the magnetic circuit, it is only needed for the structural support of the magnets and pole pieces. Additionally in all embodiments the base of the integrated ferrous structure can be locally thin in the region below the electrical coil however part of the structure must extend above the height of the magnet contained within it. The magnetic field contour line 708 shown in FIG. 7 is similar in size to the one shown in FIG. 6 element 612 although the thickness of the base is substantially reduced. This demonstrates that the thinned base does not adversely impact the magnetic circuit efficiency and allows for a significantly thinner overall device.

Figure 8A:
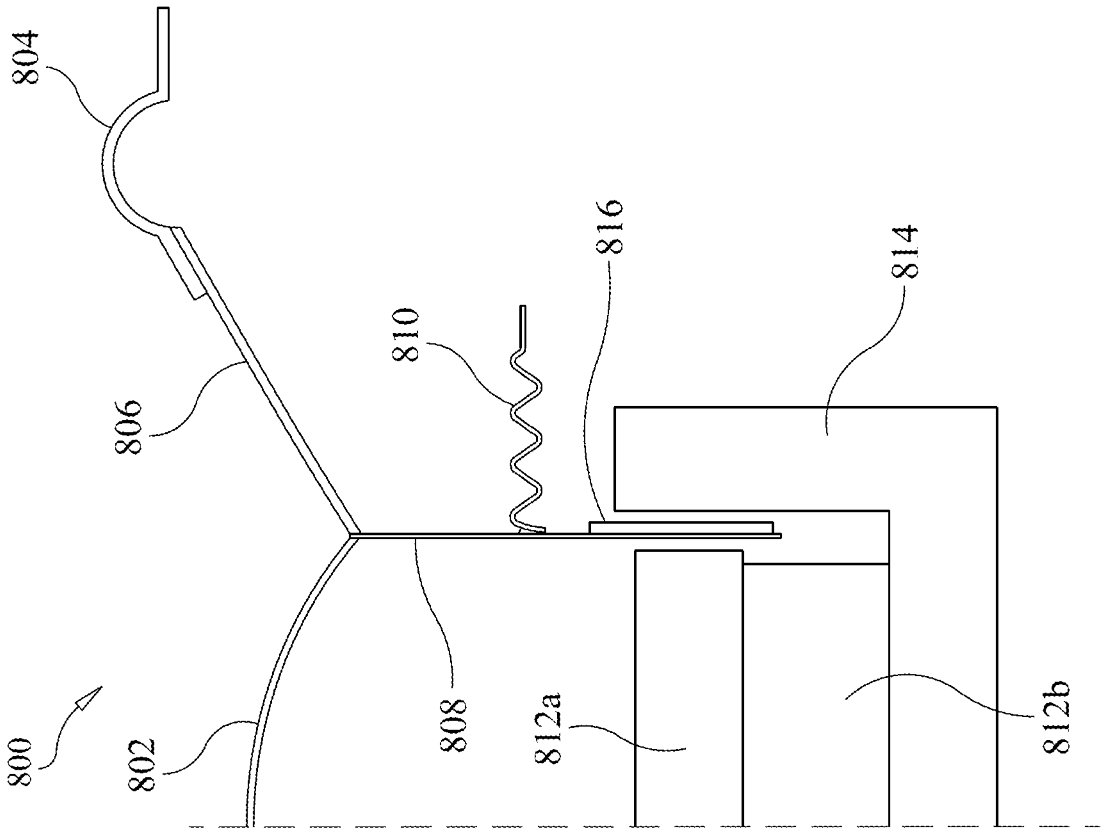
FIG. 8A is an illustration of an axisymmetric cross-section for a conventional acoustic transducer in an embodiment.

FIG. 8A is an axisymmetric illustration of a section of a conventional acoustic transducer 800 in an embodiment. In this illustrated embodiment, a diaphragm comprising a dust cap 802, and a cone structure 806, a roll surround 804, a coil former 808 and an electrical coil 816 are shown. In alternative embodiments, a diaphragm can be a one-piece structure. When used, the dust cap 802 provides a protective cover over the region enclosed by the coil former 808. A flexible roll surround 804 attached on the inner side to the perimeter of the diaphragm and on the outer side fixed to a rigid frame not shown limits the vertical movement of a vibrating diaphragm. This roll surround 804 structure serves as a first suspension element. A secondary suspension element 810 (also referred to as a "spider") also provides a motion restricting restraint to limit the vertical excursion of the diaphragm during vibrational motion. The coil former 808 and electrical coil 816 placed upon and wound around the coil former 808 are positioned within an air gap defined by ferrous cup structure 814 and, collectively, a pole piece 812*a* and a magnet 812*b*. In operation electrical current flows through the electrical coil 816 and is permeated by a static magnetic field generated from the magnet 812*b* resulting in the generation of an electromagnetic force. This electromagnetic force acts to accelerate the coil in an axial direction and causes a corresponding axial displacement in position of the coil former 808 in the air gap resulting in the vibrational motion of the diaphragm and transmission of acoustic signals from a conventional audio transducer 800. The current illustration depicts the position of these active structural elements prior to active operation.

Figure 8B:
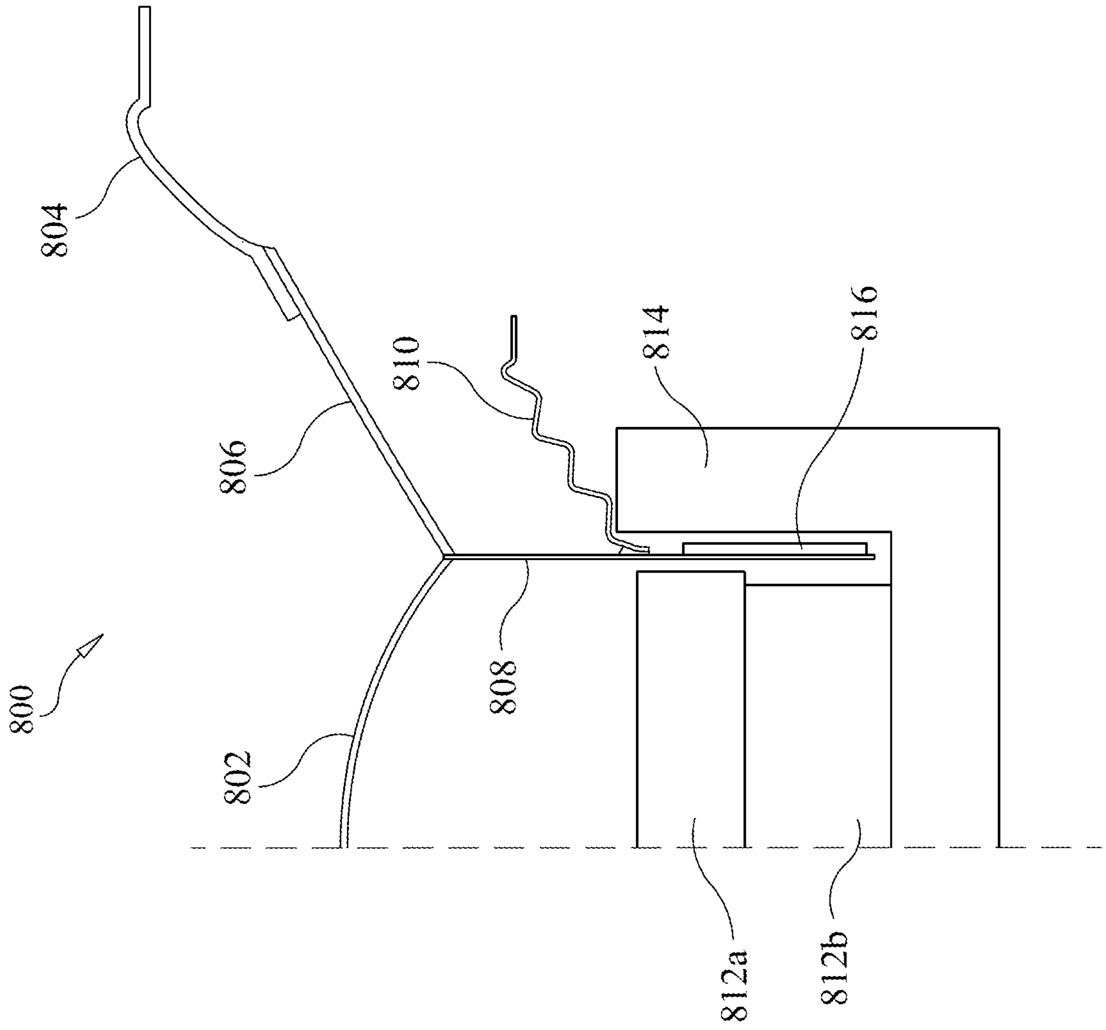
FIG. 8B is an illustration of an axisymmetric cross-section for a conventional acoustic transducer in an embodiment.

In operation, however, the positional displacement of the electrical coil 816 may cause it and the accompanying coil former 808 to be moved more deeply into the air gap, as shown in FIG. 8B, such that the spider may ultimately come into contact with the upper surface of a ferrous cup 814 resulting in a degradation in vibrational motion of a diaphragm and a corresponding degradation in the quality of audio output from the conventional audio transducer 800. Due to the risks of damage arising from such a significant mechanical problem, the transducer 800 must be made with increased vertical height to accommodate greater axial vibrational movement of the dust cap 802, the cone structure 806, the coil 816, and the coil former 808. However, many consumer products cannot accommodate the design flexibility required to increase the transducer 800 height due to industrial design constraints. Such restrictive design constraints, as well as consumer preference trends, have given rise to the motivation for defining the alternative force balanced acoustic transducer embodiments illustrated in FIGS. 3A and 3B. The removal of the spider from a location directly adjacent and above a ferrous cup 814 while maintaining control of the vibrational activity of the dust cap 802 and cone 806 were relevant considerations leading to the moving of the spider 810 off of the coil former 808 and onto a structural extension 308*a* from diaphragm 301*a*, in one embodiment, (as shown in FIG. 3A) or the moving of the spider 810 to an entirely different support member 306*a* (as shown in FIG. 3B), in an alternative embodiment.

Figure 9A:
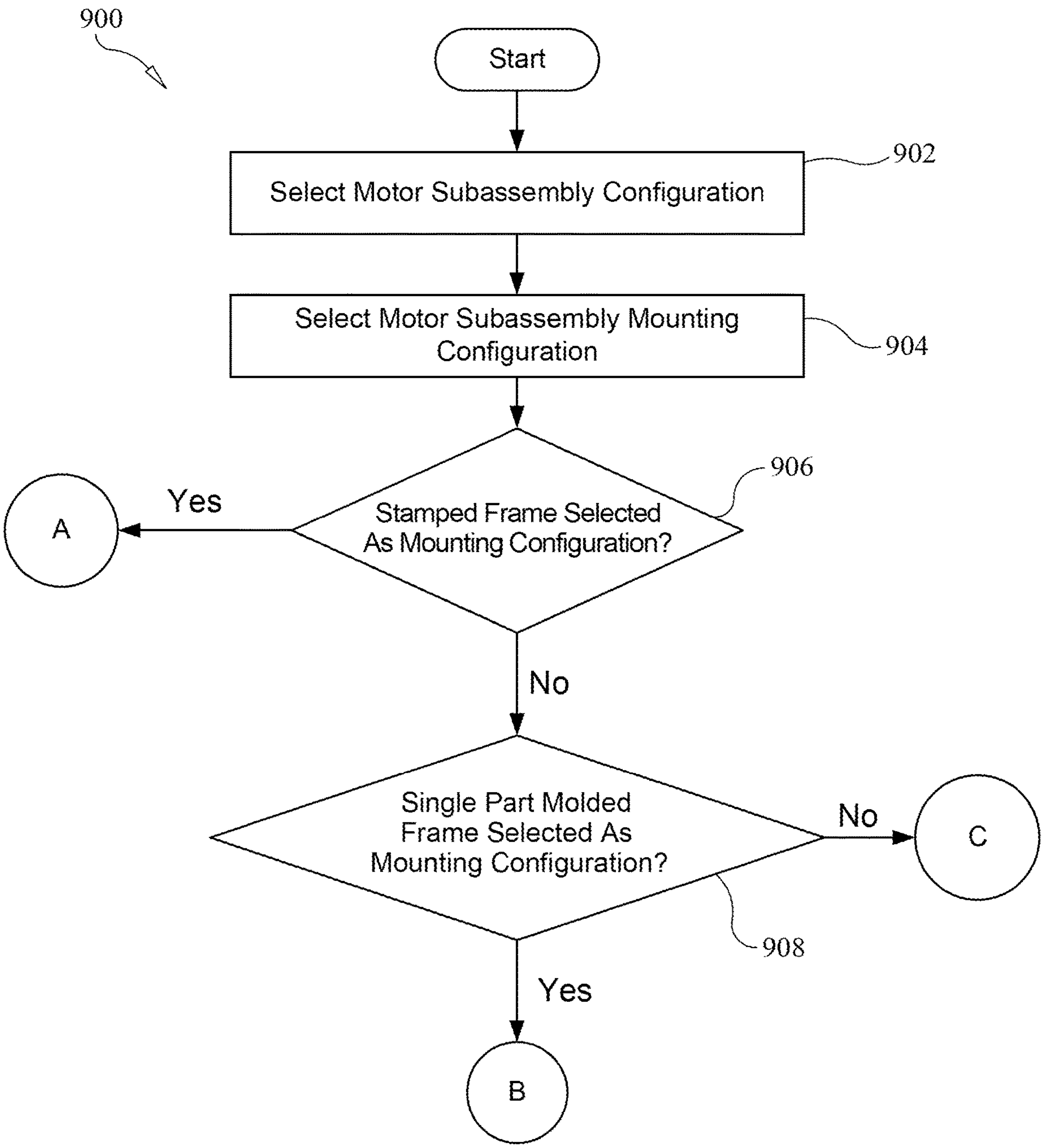
FIG. 9A is an illustration of a method for selecting a frame for a force balanced acoustic transducer in an embodiment.

FIG. 9A is an illustration of a method for assembling a force balanced audio transducer 900 in an embodiment. This method begins with the selection of a motor subassembly configuration, as shown at step 902. Although the selection of a motor subassembly configuration depends upon available supplies, materials and preference for frame assembly method, all are functionally equivalent and form a singular magnetic circuit. More specifically, in the first motor assembly configuration, the base structure of an acoustic transducer may be comprised of a ferrous cup and a sleeve that can be coupled to the outer surface of the ferrous cup. In this configuration, a first magnet and a first pole piece placed upon the magnet will be placed within the ferrous cup in the first orientation. A second magnet will be placed within the sleeve and secured to the outer surface of the ferrous cup with poles oriented in the same direction as the first magnet. The alignment of magnet polarities only applies if the magnet materials are magnetized before assembly. The second pole piece will be mounted upon the second magnet to complete the magnetic structure of the audio transducer.

In a second motor assembly configuration, a different structural configuration is formed that is comprised of two ferrous cups each facing in opposite directions which are bonded together on the outer surfaces of their bases. In the different structural configurations to be described, the magnets used in forming these configurations are initially uncharged magnets, each of which are selectively magnetized at different stages of the configuration assembly process illustrated in FIGS. 9A-9F. Such uncharged magnets, also commonly referred to as un-magnetized magnets, may be comprised of different materials. In certain embodiments, the uncharged magnets are comprised of permanent magnetic materials such as Neodymium Iron Boron (NdFeB), Ceramic (also called Ferrite), Samarium Cobalt (SmCo), and Alnico. Yet in alternative embodiments, electromagnets or field coils can be used to generate the required magnetic field for the described magnetic circuits. When using magnets comprised of permanent magnetic materials, a first magnet will be placed within a first of the two ferrous cups and a pole piece will be placed upon this first magnet. A second magnet will be placed within the second ferrous cup and a second pole piece will be secured onto the second magnet. In this structural configuration, the bonding of the two ferrous cups will facilitate the creation of an integrated magnetic circuit through which magnetic fields will flow across air gaps between the magnetic cups and each pole piece. Once the two motor halves are bonded together and magnetized, the relative polarities of the two magnets are in the same direction.

In a third motor assembly configuration, the motor subassembly configuration is comprised of an integrated dual cup structure. In this embodiment, the dual cup structure includes a space for receiving a magnet and a pole piece in both an upper location and a lower location on opposite sides. In this manner, each magnet can be independently positioned and oriented such that the dual cup structure can function as a single magnetic circuit.

After a motor sub assembly configuration is selected, step 902, the next step is to select a suitable mounting configuration, as shown at step 904. In determining a mounting configuration, at least three alternative configurations are available for receiving and securing the selected motor sub assembly configuration. In a first frame embodiment, a stamped frame can be used for receiving and securing the selected motor subassembly configuration. In a second frame embodiment, a single part molded frame component can be created around the core structure of the motor sub assembly on the audio transducer. A third frame embodiment is a multi-part molded frame configuration that can be created around the selected motor sub assembly configuration. Once a frame configuration is selected, the combination of the selected motor subassembly and selected frame configuration may be combined and implemented to construct part of the audio transducer. The suspension components, diaphragms, electrical coils, coil formers, lead out wires, and other components attached to the diaphragms may then be added to complete the assembly of the audio transducer.

Figure 9B:
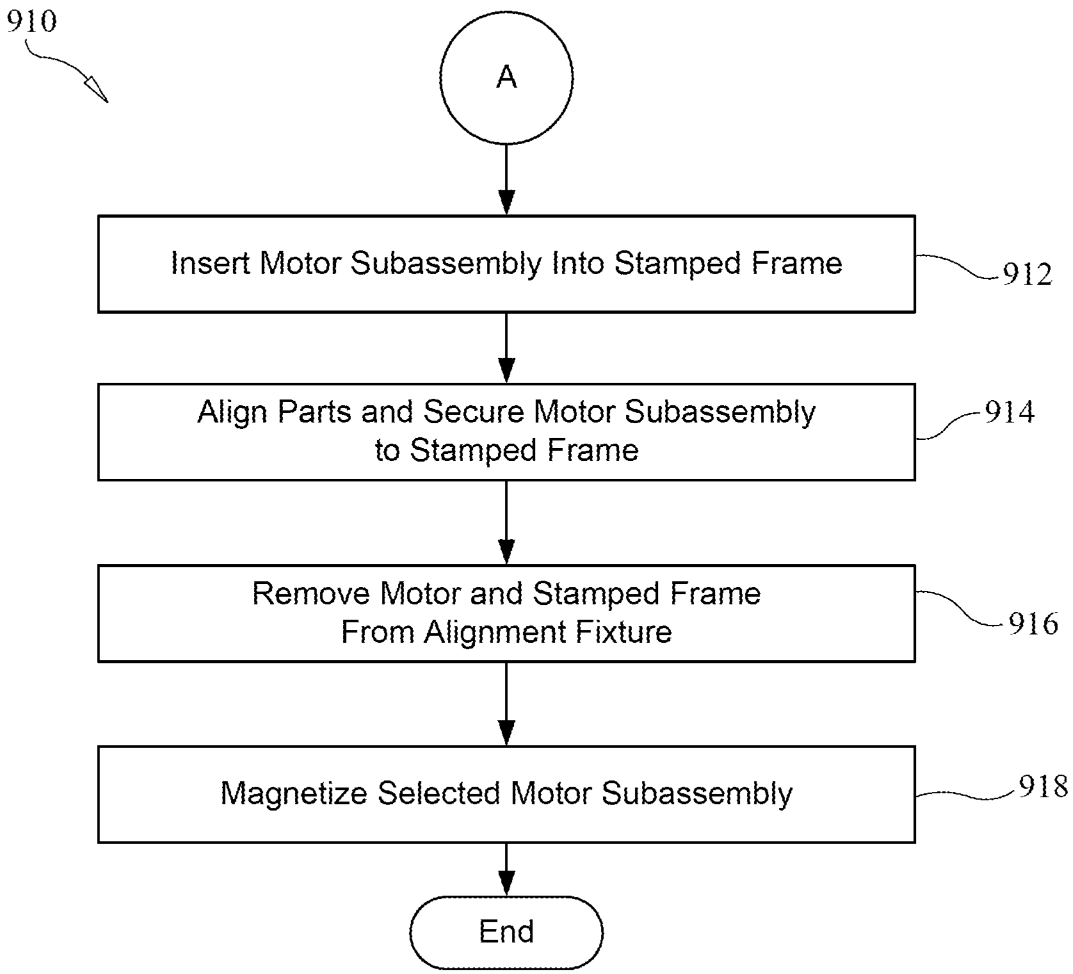
FIG. 9B is an illustration of a method for assembling a force balanced acoustic transducer including a stamped frame in an embodiment.

If a stamped frame configuration is selected from the available options, as shown at step 906, the structural formation process 910 proceeds, as shown in FIG. 9B. Initially, a metallic stamped frame will be created, and the selected motor subassembly configuration will be inserted into the stamped frame, at step 912. Once the motor subassembly configuration is inserted into the stamped frame, it will be aligned and secured to the stamped frame so that in operation the motor sub assembly will remain secured to the frame, at step 914. After establishing a proper alignment between the motor sub assembly configuration and the stamped frame, the entire structure will be removed from the alignment fixture that's shown in step 916 and it will then be magnetized, as shown at step 918, such that the magnets in the motor sub assembly will be magnetized to create and establish a continuous magnetic circuit.

Figure 9C:
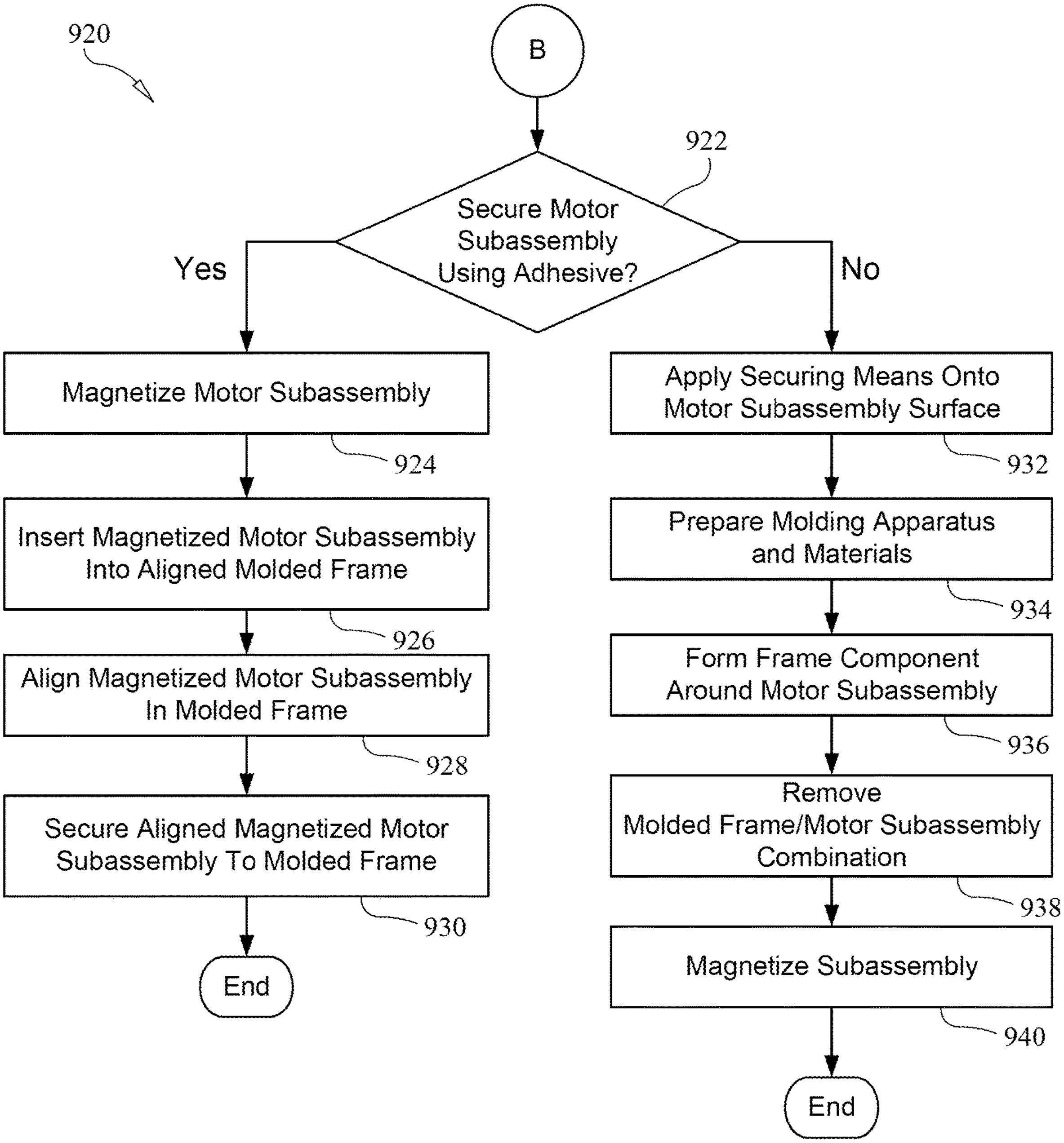
FIG. 9C is an illustration of a method for assembling a force balanced acoustic transducer including a single molded frame in an embodiment.

In the event a single part molded frame is selected as the mounting configuration, as shown at step 908 in FIG. 9A, an embodiment of a process 920 for forming an integrated motor subassembly and molded frame configuration will be performed, as illustrated in FIG. 9C. In this process, it must first be determined whether the motor subassembly is to be secured to a frame component using an adhesive, as shown at step 922. A motor subassembly can be secured to a frame component using a variety of means including an adhesive or other structural variations, in alternative embodiments, that can ensure a secure bond between a frame component and a motor subassembly configuration. In the event an adhesive is not to be used, an alternative securing means will be applied onto the outer surface of the selected motor subassembly configuration and in one embodiment this alternative securing means is accomplished by applying a knurling process onto the surface of the motor subassembly configuration, as shown in step 932, so that a roughened surface will form a secure bond to a molded frame. Knurling is but one embodiment of a securing means and in alternative embodiments, different forms of securing means can be used including a mechanical or structure locking means for securing the outer surface of the motor subassembly to the molded frame. After application of a securing means onto the surface of the selected motor subassembly configuration, a molding apparatus and molding materials will be prepared, as shown at step 934, for use in forming a molded frame component around the motor subassembly configuration, as shown at step 936. The molding materials, in one embodiment, are comprised of non-ferrous, plastics or composite plastic compounds suitable for use with an electro-magnetic structure such as ABS, Polycarbonate, glass filled polymers, and composite polymers. Once formed the complete and integrated molded frame and motor subassembly structure is removed from the securing fixture, as shown at step 938, and placed into a magnetizer, step 940, for magnetization of the motor subassembly configuration.

Returning to step 922 in FIG. 9C, if an adhesive is to be used for securing a frame to the selected motor subassembly configuration, then the motor subassembly configuration will first be magnetized, as shown at step 924. Once magnetized the motor subassembly configuration will be inserted into a previously aligned molded frame that has been formed specifically for the selected motor sub assembly configuration, as shown at step 926. After insertion, the motor sub assembly configuration will be aligned within the molded frame, as shown at step 928, and subsequently the selected motor subassembly configuration will be secured to the molded frame with an adhesive placed along the outer of the motor configuration such that a secure bonded connection can be established between the motor subassembly configuration and the aligned molded frame, as shown at step 930.

Figure 9D:
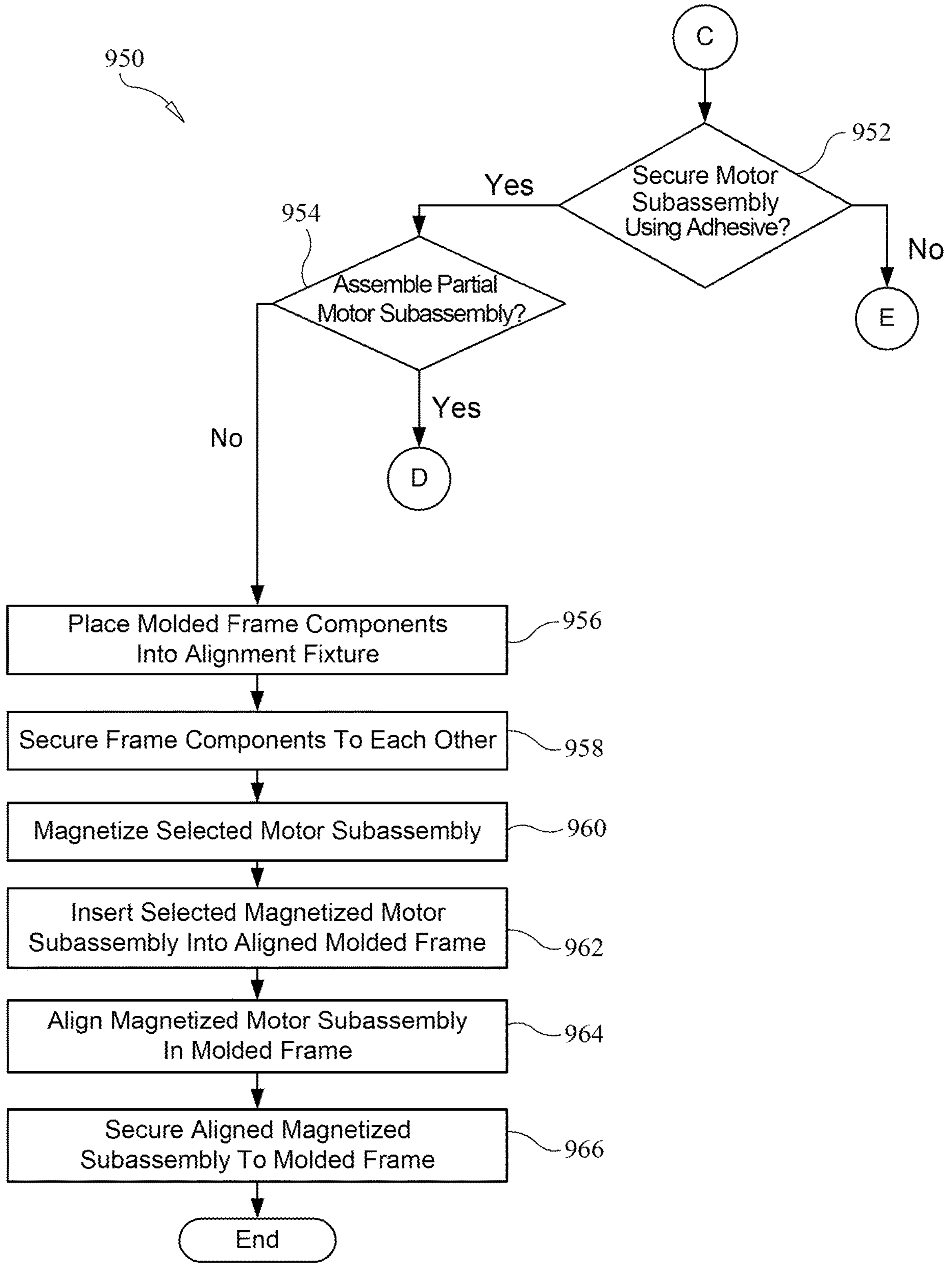
FIG. 9D is an illustration of a method for assembling a force balanced acoustic transducer including molded frame components in an embodiment.

Returning to FIG. 9A, if a two-part or multi-part frame configuration is selected, as shown at step 908, then a series of decisions are to be made in forming a frame configuration for a selected motor subassembly configuration according to the process 950 illustrated in FIG. 9D. As illustrated in this figure, the first decision is whether to secure the motor sub assembly configuration to a frame using an adhesive, as shown at step 952. If an adhesive is to be used, then it must be determined whether to partially assemble the motor subassembly, as shown at step 954. A partial assembly of the motor subassembly allows for a first part of the motor subassembly to be magnetized and then secured to the first frame. The remaining motor subassembly components form a second part of the motor subassembly. For the two-cup configuration, the second part of the motor subassembly will comprise the second ferrous cup, the second magnet, and the second pole piece. For the cup and sleeve configuration, the second part of the motor subassembly will only contain the sleeve part which is made from a ferrous non-permanently magnetic material and doesn't require the later magnetization. The dual cup motor configuration does not allow for a partial motor subassembly. It may be advantageous to use a partial motor assembly to help concentrically and axially locate motor subassembly parts within the frame or to use the higher tolerance motor parts to set constrained relationships between the frame parts in final assembly. If partial assembly is not deemed to be advantageous, then the multiple frame components, typically at least two preformed frame components, will be placed into an alignment fixture, as shown at step 956, and these frame components will be secured together, as shown at step 958. The frame components in one embodiment are secured using an adhesive, structural mounting posts, or other conventional means. Separately, the selected motor subassembly configuration will be magnetized in a magnetizer, as shown at step 960. Once magnetized, the selected motor subassembly configuration will be inserted into the aligned combination of frame components, as shown at step 962, and the magnetized motor subassembly configuration will be aligned to the molded frame components using an alignment fixture, as shown at step 964. Once aligned, the magnetized motor subassembly configuration will be secured to the frame components using the adhesive or another conventional bonding material, as shown at step 966.

Figure 9E:
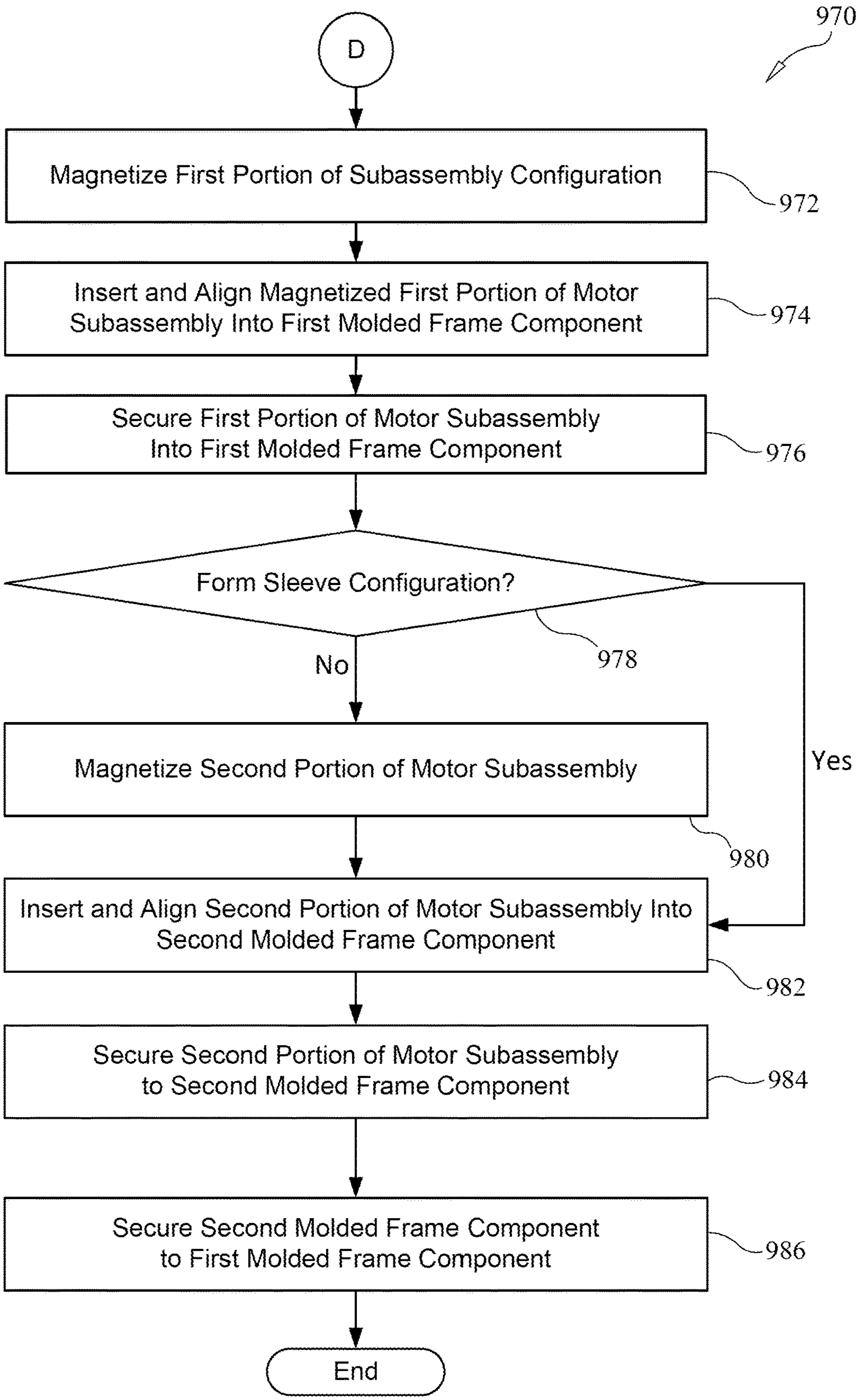
FIG. 9E is an illustration of a method for assembling a force balanced acoustic transducer including molded frame components in an embodiment.

Returning to decision step 954, if a partial motor subassembly configuration is selected, then the assembly process 970 shown in FIG. 9E will be followed. In the illustrated process 970, a first portion of a motor sub assembly configuration will be magnetized in a magnetizer, as shown at step 972. This portion is comprised of a ferrous cup, a magnet, and a pole piece in one embodiment. Once magnetized, the first portion will be inserted and aligned into a first molded frame component, as shown at step 974. The inserted and aligned first portion will be secured to the frame component using an adhesive or other conventional bonding material, as shown at step 976. When assembling the second portion of these selected motor subassemblies, a decision is to be made whether to form the motor configuration using a sleeve structure, as shown at 978. If a sleeve configuration or structure is selected, then the sleeve component is inserted and aligned to a second molded frame component, as shown at step 982. Once the sleeve is aligned within the second molded frame component an adhesive or other conventional bonding material may be used to secure them together, as shown at step 984. Upon completion of the securing of the motor assembly to the second molded frame component, the second molded frame component will be secured to the first molded frame component to form a complete integrated structure, as shown at step 986.

Alternatively if the sleeve configuration is not selected, as shown at step 978, then the second portion of the selected motor subassembly configuration, which would be comprised of a magnet and pole piece placed within a second ferrous cup, will be magnetized in a magnetizer, as shown at step 980. Once magnetized, the assembly process will continue as previously discussed with the second portion of a motor subassembly inserted and aligned to a second molded frame component, as shown at step 982. After insertion, the second portion of the motor subassembly will be secured to a second molded frame component using an adhesive bonding material, as shown at step 984. Upon bonding of the second portion of the motor subassembly to the second molded frame component, the first molded frame component including the first portion of the motor subassembly will be secured by means of an adhesive or other suitable bonding material to the second molded frame component resulting in the creation one integrated structure comprised of at least two molded frame components, as shown at step 986. In alternative embodiments, if desired, more than two molded frame components could be coupled together to form a multi frame acoustic transducer structure.

Figure 9F:
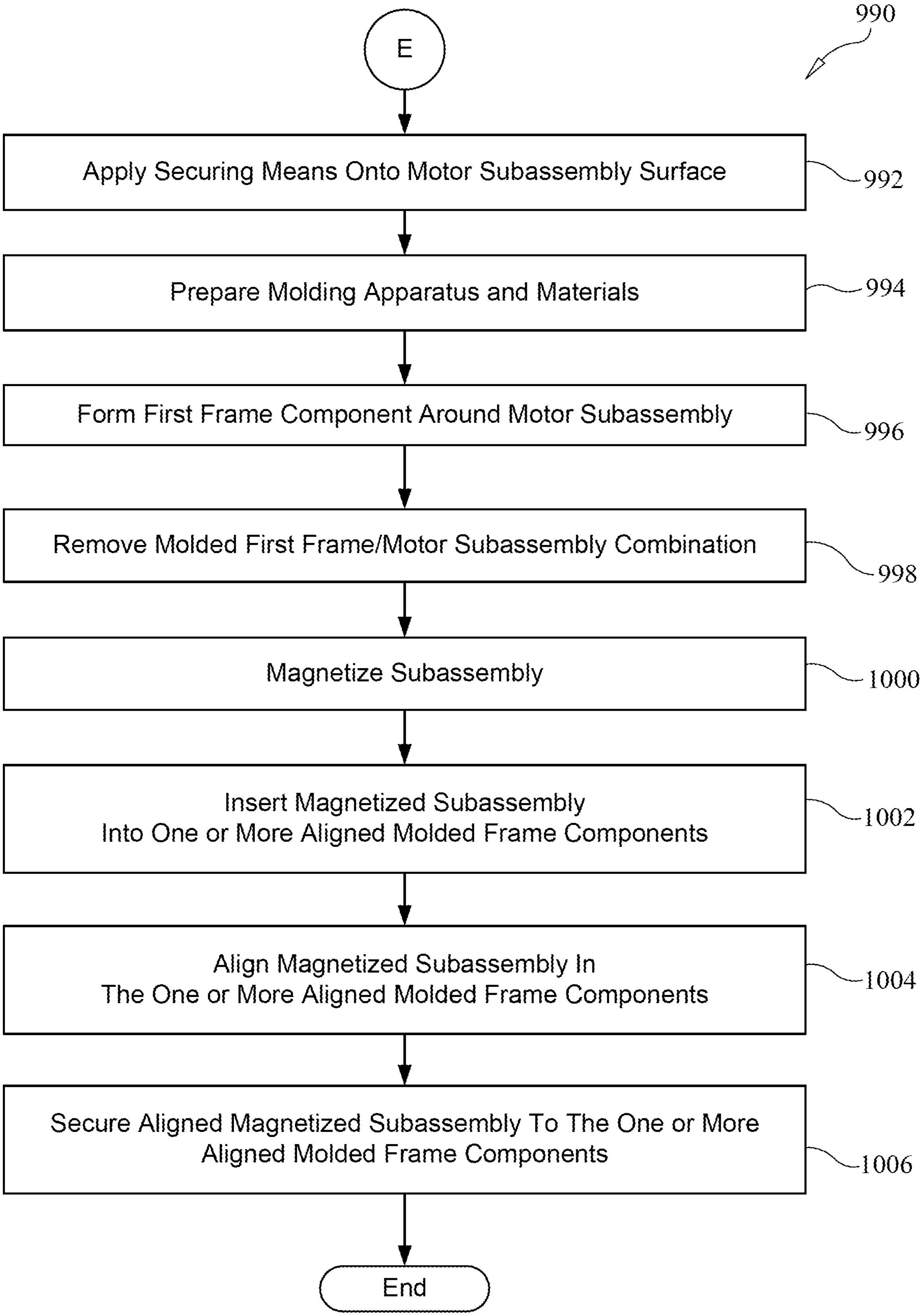
FIG. 9F is an illustration of a method for assembling a force balanced acoustic transducer including molded frame components in an embodiment.

Returning once again to FIG. 9D, if a selected motor assembly is not to be secured using an adhesive, as shown at decision step 952, the process illustrated in FIG. 9F will be performed. In the illustrated process 990 shown in FIG. 9F, a securing means will be applied on to the motor subassembly outer surface as shown at step 992. In one embodiment, the applied securing means is a knurling of the surface of the motor subassembly that will ensure the grooved structures on the surface of the motor subassembly will form a secure bond with the molded frame components that will be proximate to and in contact with the surface of the motor subassembly configuration. Afterwards, a molding apparatus and molding materials will be prepared, as shown at step 994, and the first frame component will be formed from the materials around the selected motor subassembly configuration, as shown at step 996. Once formed, the combination of molded first frame and motor subassembly configuration will be removed, as shown at step 998. Once removed, the motor subassembly will be magnetized in a magnetizer, as shown at step 1000, and inserted into a structure comprised of one or more aligned and molded frame components, as shown at step 1002. Upon insertion, the magnetized motor subassembly will be aligned to the one or more aligned and molded frame components, as shown at step 1004, and the aligned and magnetized motor subassembly will be secured to the one or more molded frame components using an adhesive or other conventional bonding material, as shown at step 1006.

Figure 10A:
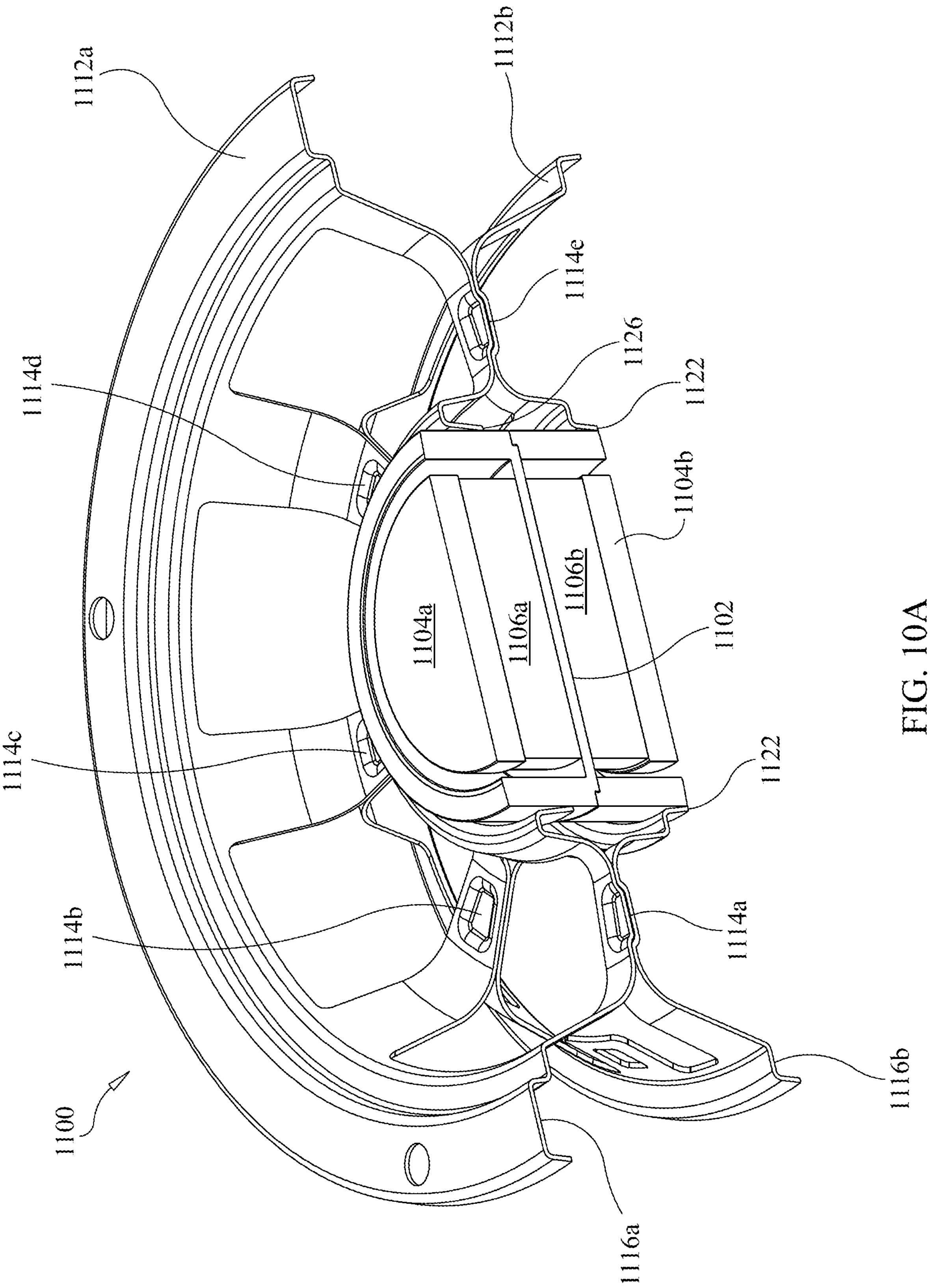
FIG. 10A is an illustration of a force balanced acoustic transducer including a two-part stamped frame in an embodiment.

FIG. 10A illustrates a partially cut away view of the motor subassembly for a force balanced acoustic transducer secured within stamped frame components in an embodiment 1100. As illustrated, a first stamped frame 1112*a* has been pre-formed to receive and secure the internal structure of an acoustic transducer 100. The motor subassembly part of the acoustic transducer 100 shown in this embodiment is comprised of a ferrous cup having a base 1102 and a sleeve structure. Placed within the ferrous cup is a first magnet 1106*a* and a pole piece 1104*a*. Included within the sleeve structure is a second magnet 1106*b* and a second pole piece 1104*b*. Each magnet 1106*a* and 1106*b* is secured to opposite surfaces of the base of a ferrous cup 1102 using an adhesive or other conventional bonding material. The first stamped frame 1112*a* is shaped to form and includes a first securing ridge securing means 1116*a* to enable the first stamped frame 1112*a* to be secured to the outer surface of a mounting enclosure or baffle adapted for receiving the transducer structure. A second stamped frame 1112*b* is provided which also includes a second securing ridge 1116*b* to enable the structure to be secured to the inner surface of a receiving mounting enclosure. The outer perimeter of the second securing ridge 1116*b* is adapted to fit within a hole of a mounting enclosure that the first securing ridge 1116*a* secures around. In one embodiment, the securing ridges 1116*a* 1116*b* can be mounting regions where foam, rubber, or adhesive gaskets may be applied to seal the inside of the audio transducer and the mounting enclosure. Additionally, mounting screws may be used to compress the gasket and ensure a tight bond between the mounting enclosure and the frame. Each stamped frame secures the motor subassembly structure in place with alignment and securing sections 1122 and 1126. Each of the securing sections 1122, 1126 holds the body of the motor subassembly in place and prevents its movement during operation. The first stamped frame 1112*a* is secured in place to the second stamped frame 1112*b* using a plurality of indented structures 1114*a*, 1114*b*, 1114*c*, 1114*d*, 1114*e*, and other similar structures (not shown). Indented structures on the first stamped frame 1112*a* insert within indentations on the second stamped frame 1112*b* to firmly couple the first stamped frame 1112*a* and the second stamped frame 1112*b*. The securing sections 1122, 1126 of each of the stamped frames 1112*a* and 1112*b* are held in place with a combination of mechanical tension and adhesive.

Figure 10B:
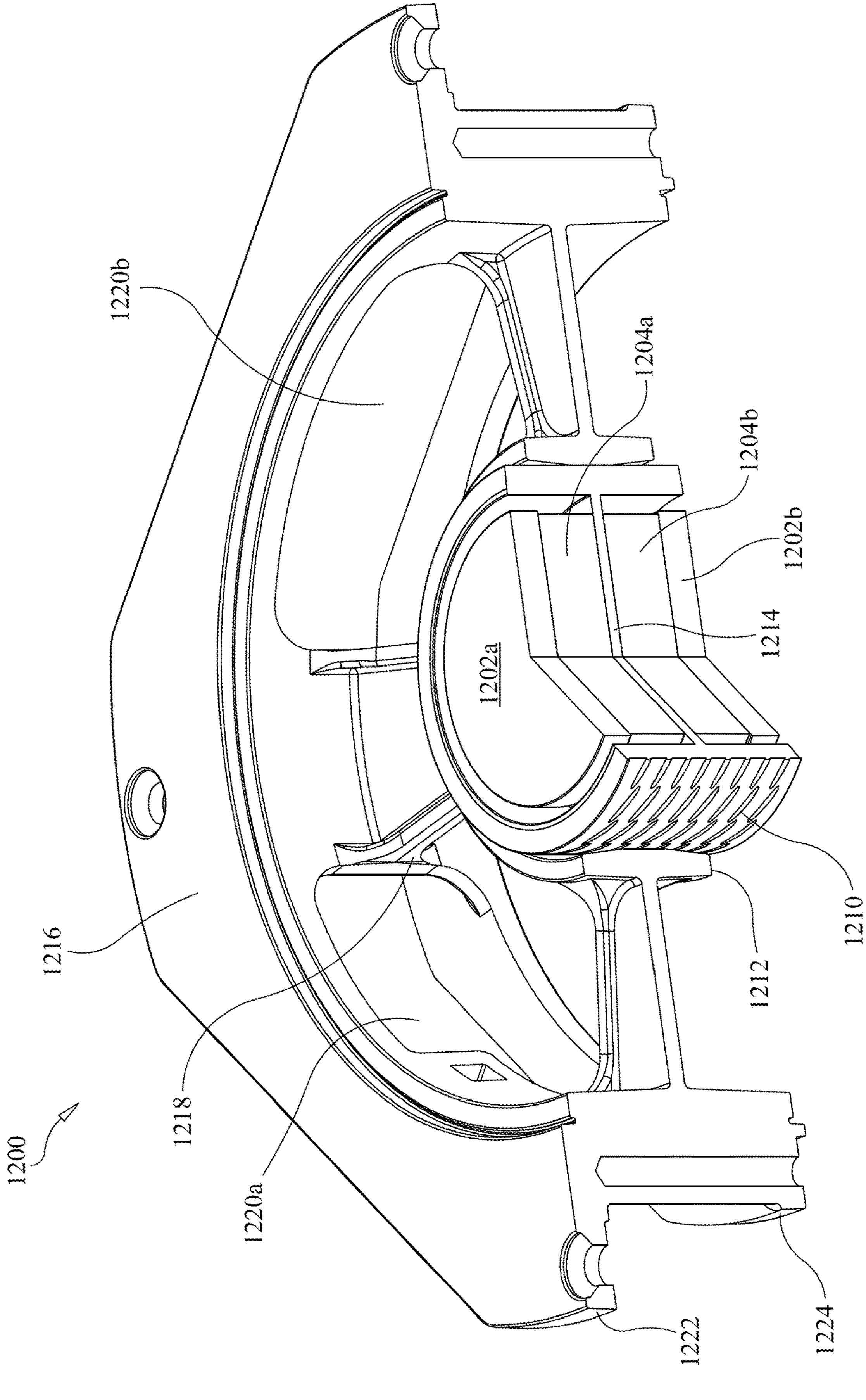
FIG. 10B is an illustration of a force balanced acoustic transducer including a single part molded frame in an embodiment.

FIG. 10B illustrates a partially cut away view of the motor subassembly for a force balanced acoustic transducer secured by a single part molded frame in an embodiment 1200. A molded frame 1216 is formed around a motor subassembly such that a secure locking connection can be formed between the outer surface of the motor subassembly and the molded frame. The molded frame 1216 also includes a plurality of supporting members 1218, a plurality of ventilation areas 1220*a*, 1220*b*. The ventilation areas 1220*a* and 1220*b* provide a means for air to move in and out of the audio transducer during vibrational operation. Also included on the molded frame 1216 is a first securing means 1222 for securing the frame to the outer surface of a receiving enclosure and a second securing means for securing the frame to an inner surface of an enclosure 1224. The first securing means 1222 and second securing means 1224 consists of mounting regions where foam, rubber, or adhesive gaskets may be applied to seal the inside of the audio transducer and the enclosure. Additionally, mounting screws may be used to compress the gasket and ensure a tight bond between the enclosure and the frame. In this embodiment, the motor subassembly is comprised of a dual cup structure having an outer surface that has been modified using a knurling process which applies a series of ridges and grooves onto the outer surface 1210 as a means for securing the body of the acoustic transducer to an interior support arm 1212 of the molded frame 1216. This dual cup structure 1214 includes an interior base upon which are secured a first magnet 1204*a* and a second magnet 1204*b*. The first magnet 1204*a* has placed upon it a first pole piece 1202*a* and the second magnet 1204*b* has placed upon it a second pole piece 1202*b*. The knurled outer surface 1210 of the dual cup structure is secured to the frame when the frame is formed around the dual cup in a molding process which fills in the ridges and grooves on the knurled surface and provides a high friction secure bond. This secured arrangement enables the motor subassembly to be firmly held in place during operation.

Figure 10C:
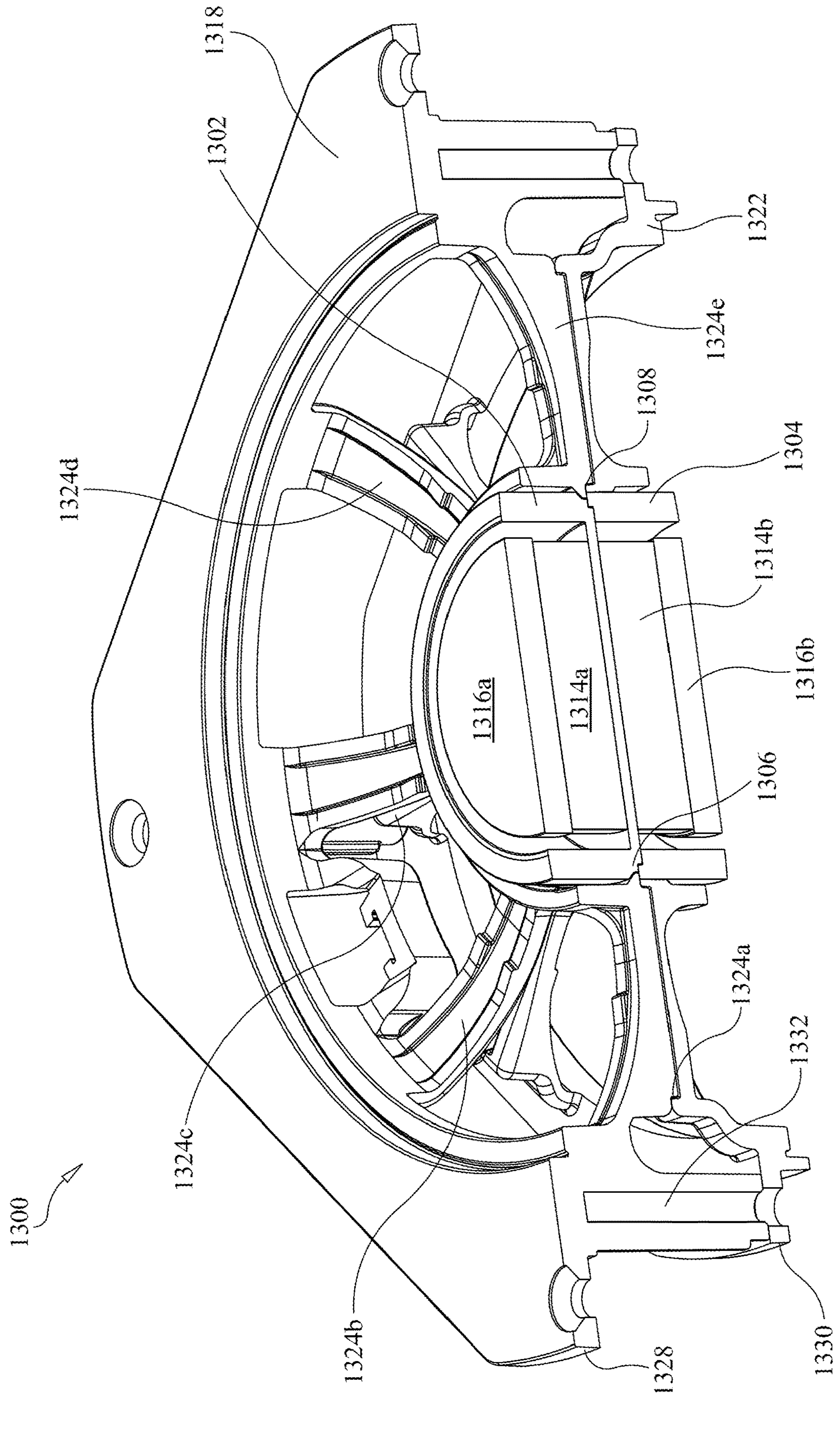
FIG. 10C is an illustration of a force balanced acoustic transducer including a two part molded frame in an embodiment.

FIG. 10C illustrates an embodiment 1300 of a partially cut away view of the two-part molded frame coupled to and securing a motor subassembly for a force balanced acoustic transducer. In this illustrated embodiment, the first part of the molded frame 1318 includes a plurality of support members 1324*a*, 1324*b*, 1324*c*, 1324*d*, 1324*e*, a mounting post 1332, and a first securing means 1328. The first securing means 1328 secures the first part of the molded frame 1318 to the outer surface of an external baffle or enclosure and the second securing means 1330 secures the entire structure to the inner surface of an enclosure for receiving the transducer. In the illustrated embodiment, the motor subassembly is comprised of a ferrous cup 1302 and a sleeve structure 1304. In an alternative embodiment, the motor subassembly can be comprised of a first ferrous cup 1302 and a second ferrous cup (not shown). The ferrous cup 1302 includes a grooved region 1306 for receiving a frame-cup alignment extension 1308 which extends from the first part of the molded frame 1318. The frame-cup alignment extension 1308 sets the insertion depth and aids in the axial alignment of the ferrous cup 1302 within the first molded frame 1318 when slidably inserted into the grooved region 1306 of the ferrous cup 1302. During assembly, the sleeve structure 1304 is secured to an outer surface of the base of the ferrous cup 1302 after the ferrous cup 1302 is placed and aligned within the first molded frame 1318 using the frame-cup alignment extension 1308. In one embodiment of the assembly process, the sleeve structure 1304 is secured to the frame-cup alignment extension 1308 and the outer surface of the base of the ferrous cup 1302 after it is first placed and secured within the second part of the molded frame 1322. In an alternative embodiment of the process, the sleeve structure 1304 is secured to the frame-cup alignment extension 1308 and the outer surface of the base of the ferrous cup 1302 before being placed and secured within the second part of the molded frame 1322. In both embodiments, the sleeve structure 1304 is aligned once secured to the outer surface of the base of the ferrous cup 1302 and the frame-cup alignment extension 1308. The ferrous cup 1302 includes within a first placement region a first magnet 1314*a* and a first pole piece 1316*a* placed upon the first magnet 1314*a*. The first magnet 1314*a* is secured to an inner surface of the base of the ferrous cup 1302. Within the sleeve structure 1304, a second placement region is defined in which a second magnet 1314*b* is placed and secured to the outer surface of the base of the ferrous cup 1302. A second pole piece 1316*b* is placed upon and secured onto the second magnet 1314*b*. The second part of the molded frame 1322 provides additional structural support for the first part molded frame 1318 and the two-part components of the motor subassembly, the sleeve structure 1304 and the ferrous cup 1302. The second securing means 1330 is provided on the outer surface of the second part of the molded frame 1322.

Although specific embodiments have been illustrated and described herein, it will be appreciated by those of ordinary skill in the art that a wide variety of alternate and/or equivalent implementations may be substituted for the specific embodiments shown and described without departing from the scope of the present disclosure. This application is intended to cover any adaptations or variations of the embodiments discussed herein.

What is claimed is:

1. An acoustic transducer comprising:

a plurality of acoustic diaphragms configured to vibrate in opposing directions in response to a received electrical signal;

a frame assembly comprising at least one frame component, the frame assembly coupled to a first diaphragm and a second diaphragm of the plurality of acoustic diaphragms;

a plurality of suspension elements comprising at least two primary-suspension-elements and at least two secondary-suspension-elements, each acoustic diaphragm connected to a first end of a primary-suspension-element and coupled to a first end of a secondary-suspension-element, each primary-suspension-element having a second end connected to an external section of the frame assembly, each secondary-suspension-element having a second end connected to an internal extended section of the frame assembly; and a magnet assembly fixedly positioned within the frame assembly, the magnet assembly including a housing, at least two magnets, a first pole piece mounted on a first magnet of the at least two magnets and a second pole piece mounted on a second magnet of the at least two magnets, the housing having at least a first region for placement of the first magnet and a first vertical portion having a vertical height greater than a vertical height of the first magnet or the second magnet of the at least two magnets, the first magnet and the second magnet having a directionally similar magnetic orientation, wherein the housing is one of a ferrous cup and a sleeve structure, a first ferrous cup and a second ferrous cup, or a dual-cup structure, wherein the ferrous cup includes a base having a thickness less than a width of the first vertical portion, wherein the first ferrous cup includes a first base and the second ferrous cup includes a second base, the first base having a thickness less than the width of the first vertical portion, the second base having a thickness less than a width of a second vertical portion of the second ferrous cup, and wherein the dual-cup structure includes a base and a wall extending in equal and opposite directions from the base in place of the first vertical portion, a vertical height of the wall in each direction greater than the vertical height of the first magnet or the second magnet, the base having a thickness less than a width of the wall.

2. The acoustic transducer of claim 1 wherein the magnet assembly defines a magnetic circuit having a static magnetic field established between the first magnet and the second magnet.

3. The acoustic transducer of claim 2 wherein the magnet assembly further comprises:

a first electrical coil wound upon a first coil former coupled to a first diaphragm of the plurality of diaphragms, the coil former placed within an air gap defined between the first vertical portion of the housing, the first magnet of the at least two magnets, and the first pole piece; and a second electrical coil wound upon a second coil former coupled to a second diaphragm of the plurality of diaphragms, the coil former placed within an air gap defined between the second vertical portion of the housing, the second magnet of the at least two magnets, and the second pole piece, the second vertical portion of the housing having a vertical height greater than the vertical height of the first magnet or the second magnet of the at least two magnets, wherein the plurality of acoustic diaphragms vibrate in response to receiving the electrical signal on the first electrical coil and the second electrical coil in the presence of the established static magnetic field.

4. The acoustic transducer of claim 3 wherein:

the first vertical portion and an inner surface of the base of the housing comprise the first region for placement of the first magnet of the at least two magnets; and the second vertical portion and an outer surface of the base of the housing comprise a second region for placement of the second magnet of the at least two magnets.

5. The acoustic transducer of claim 3 wherein each of the electrical coils are symmetrically positioned relative to a plane normal to a direction of vibration of the plurality of acoustic diaphragms, each electrical coil having substantially similar dimensional and conductive properties, wherein, when subject to an electromagnetic force from the received electrical signal in the presence of the static magnetic field, each electrical coil generates a reaction force in response to the electromagnetic force, the reaction force substantially cancelling in the magnet assembly an equal and directionally opposite reaction force from an opposing electrical coil.

6. The acoustic transducer of claim 1 wherein the base includes an inner surface and an outer surface, the first magnet placed on the inner surface of the base, the second magnet placed on the outer surface of the base.

7. The acoustic transducer of claim 1 wherein the base of the dual-cup structure includes a first surface and a second surface, the first magnet placed on the first surface in the first region for placement of the fir magnet, the second magnet placed on the second surface in a second region for placement of the second magnet.

8. The acoustic transducer of claim 1 wherein the first ferrous cup is comprised of the first base and the first vertical portion, the second ferrous cup is comprised of the second base and a second vertical portion, and an outer surface of the first base is bonded to an outer surface of the second base, the first base and the first vertical portion forming the first region for placement of the first magnet of the at least two magnets, the second base and the second vertical portion forming a second region for placement of the second magnet of the at least two magnets, the second vertical portion being greater in height than a vertical height of the first magnet or the second magnet of the at least two magnets, the first magnet placed on an inner surface of the first base, the second magnet placed on an inner surface of the second base.

9. The acoustic transducer of claim 1 wherein the ferrous cup includes a grooved region for receiving an alignment extension extending from the at least one frame component and the sleeve structure is bonded to an outer surface of the base of the ferrous cup and the alignment extension, the sleeve structure having a vertical height greater than a vertical height of the first magnet or the second magnet.

10. The acoustic transducer of claim 9 wherein the at least one frame component comprises a two-part molded frame, a first part of the two-part molded frame including the alignment extension, a second part of the two-part molded frame securing and aligning the sleeve structure.

11. The acoustic transducer of claim 1 wherein a first stamped frame and a second stamped frame are used in place of the at least one frame component, the first stamped frame including a first alignment-and-securing section, the second stamped frame including a second alignment-and-securing section, the first alignment-and-securing section securing and aligning the first ferrous cup in the housing, the second alignment-and-securing section securing and aligning one of the second ferrous cup or the sleeve structure provided in the housing.

12. The acoustic transducer of claim 1 wherein the at least one frame component is a single molded frame used for securing the dual-cup structure.

13. The acoustic transducer of claim 12 wherein an outer surface of the dual-cup structure is formed using a knurling process, the knurling process providing a plurality of structures on the outer surface of the dual-cup structure for securing the single molded frame to the dual-cup structure.

14. The acoustic transducer of claim 1 wherein each of the primary-suspension-elements are symmetrically positioned relative to a plane normal to a direction of vibration of the plurality of acoustic diaphragms, each primary-suspension-element having substantially similar mechanical properties, wherein, when vibrating, each primary-suspension-element generates a reaction force in response to a restoring force, the reaction force substantially cancelling in the frame assembly an equal and directionally opposite reaction force from an opposing primary-suspension-element, and wherein each of the secondary-suspension-elements are symmetrically positioned relative to a plane normal to a direction of vibration of the plurality of acoustic diaphragms, each secondary-suspension-element having substantially similar mechanical properties, wherein, when vibrating, each secondary-suspension-element generates a reaction force in response to a restoring force, the reaction force substantially cancelling in the frame assembly an equal and directionally opposite reaction force from an opposing secondary suspension element.

15. The acoustic transducer of claim 14 wherein the first end of each secondary-suspension-element is connected to a structural extension of the first diaphragm or the second diaphragm.

16. The acoustic transducer of claim 14 wherein the first end of a first one of the at least two secondary-suspension-elements is connected to a first end of a first support component, a second end of the first support component connected to an inner surface of the first diaphragm, and the first end of a second one of the at least two secondary-suspension-elements is connected to a first end of a second support component, a second end of the second support component connected to an inner surface of the second diaphragm.

17. The acoustic transducer of claim 1 wherein the frame assembly further comprises a plurality of securing means for securing the acoustic transducer to a mounting enclosure having a first surface and a second surface, the plurality of securing means comprising a first securing ridge and a second securing ridge, the first securing ridge securing a first end of the frame assembly to the first surface of the mounting enclosure, the second securing ridge securing a second end of the frame assembly to the second surface of the mounting enclosure.

18. A method of making a force-balanced acoustic transducer, the method comprising:

providing a plurality of acoustic diaphragms configured to vibrate in opposing directions in response to a received electrical signal;

providing a frame assembly comprising at least one frame component, the frame assembly coupled to a first diaphragm and a second diaphragm of the plurality of acoustic diaphragms;

providing a plurality of suspension elements comprising at least two primary-suspension elements and at least two secondary-suspension-elements, each acoustic diaphragm coupled to a first end of a primary-suspension-element and a first end of a secondary-suspension-element, each primary-suspension-element and each secondary-suspension-element coupled to the frame assembly; and providing a magnet assembly fixedly positioned within the frame assembly, the magnet assembly including a housing, at least two magnets, a first pole piece mounted on a first magnet of the at least two magnets and a second pole piece mounted on a second magnet of the at least two magnets, the housing having at least a first region for placement of the first magnet of the at least two magnets and a first vertical portion having a vertical height greater than a vertical height of the first magnet or the second magnet of the at least two magnets, the first magnet and the second magnet having a directionally similar magnetic orientation, the housing including a base having a thickness less than a width of the first vertical portion.

19. The method of claim 18 wherein the providing of the magnet assembly further comprises:

providing a magnetic circuit having a static magnetic field established between the first magnet and the second magnet.

20. The method of claim 19 wherein the providing of the magnet assembly further comprises:

providing a first electrical coil wound upon a first coil former coupled to a first diaphragm of the plurality of diaphragms, the coil former placed within an air gap defined between the first vertical portion of the housing, the first of the at least two magnets, and the first pole piece;

providing a second electrical coil wound upon a second coil former coupled to a second diaphragm of the plurality of diaphragms, the coil former placed within an air gap defined between a second vertical portion of the housing, the second magnet of the at least two magnets, and the second pole piece, the second vertical portion of the housing having a vertical height greater than a vertical height of the first magnet or the second magnet of the at least two magnets;

receiving the electrical signal on the first electrical coil and the second electrical coil in the presence of the established static magnetic field; and vibrating the plurality of acoustic diaphragms in response to the receiving of the electrical signal on the first electrical coil and the second electrical coil in the presence of the established static magnetic field.

21. The method of claim 20 further comprising:

forming the first region for placement of the first magnet of the at least two magnets from the first vertical portion and an inner surface of the base of the housing; and forming the second region for placement of the second magnet of the at least two magnets from the second vertical portion and an outer surface of the base of the housing.

22. The method of claim 20 further comprising:

positioning each of the electrical coils symmetrically relative to a plane normal to a direction of vibration of the plurality of acoustic diaphragms; and cancelling in the magnet assembly equal and directionally opposite reaction forces when the symmetrically positioned electrical coils are subject to an electromagnetic force from the received electrical signal in the presence of the static magnetic field.

23. The method of claim 18 further comprising:

providing a first stamped frame and a second stamped frame in place of the at least one frame component;

providing a first alignment-and-securing section on the first stamped frame, the first alignment-and-securing section securing a first ferrous cup to the first stamped frame and aligning the first ferrous cup to a second ferrous cup or a sleeve structure provided in the housing; and providing a second alignment-and-securing section on the second stamped frame, the second alignment-and-securing section securing one of the second ferrous cup or the sleeve structure to the second stamped frame and aligning the second ferrous cup or the sleeve structure to the first ferrous cup provided in the housing.

24. The method of claim 18 wherein the providing of the frame assembly comprises:

providing a single molded frame as the at least one frame component;

forming a plurality of structures on an outer surface of a dual-cup structure using a knurling process; and securing the single molded frame to the dual-cup structure using the plurality of structures on the outer surface of the dual-cup structure formed from the knurling process.

25. The method of claim 18 wherein the providing of the frame assembly comprises:

providing a two-part molded frame as the at least one frame component, a first part of the two-part molded frame including an alignment extension; and providing a sleeve structure secured to a second part of the two-part molded frame, the sleeve structure aligned to a ferrous cup in the first part of the two-part molded frame using the alignment extension.

* * * * *